US012780130B2

(12) United States Patent
Gupta et al.

(10) Patent No.: US 12,780,130 B2
(45) Date of Patent: Nov. 3, 2026

(54) METHOD AND SYSTEM TO INTEGRATE A LARGE LANGUAGE MODEL WITH AN IN-VEHICLE VOICE ASSISTANT

(71) Applicant: Mercedes-Benz Group AG, Stuttgart (DE)

(72) Inventors: Sachin Gupta, Santa Clara, CA (US); Albert Zarate, San Jose, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 6 days.

(21) Appl. No.: 19/054,323

(22) Filed: Feb. 14, 2025

(65) Prior Publication Data

US 2025/0263033 A1 Aug. 21, 2025

Related U.S. Application Data

(60) Provisional application No. 63/554,600, filed on Feb. 16, 2024.

(51) Int. Cl.

*B60R 16/037* (2006.01)
*B60K 35/10* (2024.01)
*G10L 15/22* (2006.01)

(52) U.S. Cl.

CPC .......... *B60R 16/0373* (2013.01); *B60K 35/10* (2024.01); *G10L 15/22* (2013.01); *B60K 2360/148* (2024.01); *G10L 2015/223* (2013.01)

(58) Field of Classification Search

CPC ................ B60R 16/0373; B60K 35/10; B60K 2360/148; G10L 15/22; G10L 2015/223

See application file for complete search history.

(56) References Cited

U.S. PATENT DOCUMENTS 11,404,075 B1 * 8/2022 Lakhani .................. G10L 25/51
12,431,131 B1 * 9/2025 Balasubramaniam ....................... G10L 15/197

(Continued)

OTHER PUBLICATIONS

LangChain, "Build a retrieval augmented generation (RAG) App: part 1", https://python.langchain.com/docs/tutorials/rag/, retrieved on Feb. 14, 2025, 25 pages.

(Continued)

*Primary Examiner* — Kyle J Kingsland
(74) *Attorney, Agent, or Firm* — Dority & Manning, P.A.

(57) ABSTRACT

Methods, computing systems, and technology for personalizing a user experience in a vehicle. For example, a computing system may be configured to receive a user prompt from a user, wherein the user prompt is input into a voice assistant on-board the vehicle. The computing system may be configured to process the user prompt with a master language model agent. The master language model agent may determine, based on environmental data, one or more intermediate actions responsive to the user prompt. The master language model agent may evaluate, based on the environmental data, whether each intermediate action of the one or more intermediate actions satisfies the user prompt. The computing system may be configured to output one or more command instructions to the voice assistant, wherein the one or more command instructions cause the voice assistant to provide, using one or more human-machine interfaces, a response to the user prompt.

20 Claims, 12 Drawing Sheets

(56) References Cited

U.S. PATENT DOCUMENTS

| | | | | |
|---|---|---|---|---|
| 2015/0234807 A1* | 8/2015 | Phillips | G06F 16/273 | 704/9 |
| 2015/0310865 A1* | 10/2015 | Fay | G10L 15/01 | 704/254 |
| 2024/0013776 A1* | 1/2024 | Zhao | G10L 15/22 | |
| 2025/0104708 A1* | 3/2025 | Harvey | G10L 15/22 | |

OTHER PUBLICATIONS

LangChain, "Build a retrieval augmented generation (RAG) app: part 2", https://python.langchain.com/docs/tutorials/ga_chat_history/, retrieved Feb. 15, 2025, 20 pages.
LangChain, "Introduction", https://python.langchain.com/docs/introduction/, retrieved on Feb. 14, 2025, 5 pages.
LangChain, "Q&A with RAG", https://python.langchain.com/v0.1/docs/use_cases/question_answering/, retrieved on Feb. 14, 2025, 3 pages.
LangChain, "Retrieval", https://python.langchain.com/v0.1/docs/modules/data_connection/, retrieved on Feb. 14, 2025, 3 pages.
Yao et al., "ReAct: synergizing reasoning and acting in language models", https://react-lm.github.io/, retrieved on Feb. 14, 2025, 3 pages.
Yao et al., "ReAct: synergizing reasoning and acting in language models", Princeton University, Conference Paper ICLR, 2023, 33 pages.

* cited by examiner

METHOD AND SYSTEM TO INTEGRATE A LARGE LANGUAGE MODEL WITH AN IN-VEHICLE VOICE ASSISTANT

CROSS-REFERENCE TO RELATED APPLICATIONS

The present application claims the benefit of and the priority to U.S. Provisional Application No. 63/554,600, filed Feb. 16, 2024. U.S. Provisional Application No. 63/554,600 is hereby incorporated by reference in its entirety.

FIELD

The present disclosure relates to a method, system, and computer program product for vehicle computing customization.

BACKGROUND

Voice assistant programs extend the functionality of vehicles allowing drivers and passengers to make hands-free calls, play music on demand, request directions or destination suggestions, etc. For instance, voice assistants may autonomously complete tasks increasing the capacity and productivity of users.

SUMMARY

Aspects and advantages of implementations of the present disclosure will be set forth in part in the following description, or may be learned from the description, or may be learned through practice of the implementations.

One example aspect of the present disclosure is directed to a computing system of a vehicle. The computing system includes a control circuit configured to receive, by one or more interior vehicle sensors, a user prompt from a user, wherein the user prompt is input into a voice assistant on-board the vehicle. The control circuit is configured to process, using one or more processors, the user prompt with a master language model agent. The master language model agent is configured to determine, based on environmental data, one or more intermediate actions responsive to the user prompt, wherein the environmental data is received from at least one of (i) the one or more interior vehicle sensors, (ii) one or more exterior vehicle sensors, (iii) user input, or (iv) one or more remote computing systems. The master language model agent is configured to iteratively evaluate, based on the environmental data, whether each intermediate action of the one or more intermediate actions satisfies the user prompt, wherein iteratively evaluating each intermediate action includes implementing each intermediate action and reasoning over a result of each intermediate action to determine whether the user prompt is satisfied. The control circuit is configured to output one or more command instructions to the voice assistant, wherein the one or more command instructions cause the voice assistant to provide, using one or more human-machine interfaces, a response to the user prompt.

In an embodiment, the master language model agent is further configured to determine, based on the one or more intermediate actions, one or more vehicle actions responsive to the user prompt. In an embodiment, the master language model agent is further configured to output the one or more command instructions to activate a vehicle function corresponding to the one or more vehicle actions.

In an embodiment, the vehicle function includes at least one of (i) emitting an audio response, (ii) updating a user interface within the vehicle, (iii) adjusting a temperature setting within the vehicle, (iv) providing an entertainment suggestion, (v) providing a destination suggestion, or (vi) adjusting a comfort setting with the vehicle.

In an embodiment, the environmental data includes data captured by one or more interior vehicle sensors or exterior vehicle sensors.

In an embodiment, the master language model agent is further configured to generate, based on the environmental data, context data associated with a user profile of the user, wherein the context data includes additional information associated with the user prompt.

In an embodiment, the one or more intermediate actions are determined based on the context data and wherein the one or more intermediate actions satisfies the user prompt based on the context data.

In an embodiment, the one or intermediate actions includes communicating with another language model agent, the other language model agent associated with at least one of: (i) a specialized machine-learned model or (ii) a dataset remote from the master language model agent.

In an embodiment, the master language model agent is configured further to determine, based on the environmental data, an intent of the user, the intent associated with the one or more intermediate actions. In an embodiment, the master language model agent is configured further to determine the one or more intermediate actions based on the intent of the user.

In an embodiment, the master language model agent is further configured to orchestrate communications and actions across a plurality of language model agents to implement the one or more intermediate actions.

In an embodiment, the one or more intermediate actions that satisfies the user prompt is indicative of an implicit action associated with the user prompt.

One example aspect of the present disclosure is directed to a computer-implemented method. The computer-implemented method includes receiving, by one or more interior vehicle sensors, a user prompt from a user, wherein the user prompt is input into a voice assistant on-board the vehicle. The computer-implemented method includes processing, using one or more processors, the user prompt with a master language model agent. The master language model agent is configured to determine, based on environmental data, one or more intermediate actions responsive to the user prompt, wherein the environmental data is received from at least one of (i) the one or more interior vehicle sensors, (ii) one or more exterior vehicle sensors, (iii) user input, or (iv) one or more remote computing systems. The master language model agent is configured to iteratively evaluate, based on the environmental data, whether each intermediate action of the one or more intermediate actions satisfies the user prompt, wherein iteratively evaluating each intermediate action includes implementing each intermediate action and reasoning over a result of each intermediate action to determine whether the user prompt is satisfied. The computer-implemented method includes outputting one or more command instructions to the voice assistant, wherein the one or more command instructions cause the voice assistant to provide, using one or more human-machine interfaces, a response to the user prompt.

In an embodiment, the master language model agent is further configured to determine, based on the one or more intermediate actions, one or more vehicle actions responsive to the user prompt. In an embodiment, the master language model agent is further configured to output the one or more command instructions to activate a vehicle function corresponding to the one or more vehicle actions.

In an embodiment, the vehicle function includes at least one of (i) emitting an audio response, (ii) updating a user interface within the vehicle, (iii) adjusting a temperature setting within the vehicle, (iv) providing an entertainment suggestion, (v) providing a destination suggestion, or (vi) adjusting a comfort setting with the vehicle.

In an embodiment, the environmental data includes data captured by one or more interior vehicle sensors or exterior vehicle sensors.

In an embodiment, the master language model agent is further configured to generate, based on the environmental data, context data associated with a user profile of the user, wherein the context data includes additional information associated with the user prompt.

In an embodiment, the one or more intermediate actions are determined based on the context data and wherein the one or more intermediate actions satisfies the user prompt based on the context data.

In an embodiment, the one or intermediate actions includes communicating with another language model agent, the other language model agent associated with at least one of: (i) a specialized machine-learned model or (ii) a dataset remote from the master language model agent.

In an embodiment, the master language model agent is configured further to determine, based on the environmental data, an intent of the user, the intent associated with the one or more intermediate actions. In an embodiment, the master language model is configured further to determine the one or more intermediate actions based on the intent of the user.

In an embodiment, the master language agent model is further configured to orchestrate communications and actions across a plurality of language model agents to implement the one or more intermediate actions.

One example aspect of the present disclosure is directed to one or more non-transitory computer-readable media that store instructions that are executable by a control circuit to: receive, by one or more interior vehicle sensors, a user prompt from a user, wherein the user prompt is input into a voice assistant on-board the vehicle; process, using one or more processors, the user prompt with a master language model agent, wherein the master language model agent is configured to: determine, based on environmental data, one or more intermediate actions responsive to the user prompt, wherein the environmental data is received from at least one of (i) the one or more interior vehicle sensors, (ii) one or more exterior vehicle sensors, (iii) user input, or (iv) one or more remote computing systems; and iteratively evaluate, based on the environmental data, whether each intermediate action of the one or more intermediate actions satisfies the user prompt, wherein iteratively evaluating each intermediate action includes implementing each intermediate action and reasoning over a result of each intermediate action to determine whether the user prompt is satisfied; and output one or more command instructions to the voice assistant, wherein the one or more command instructions cause the voice assistant to provide, using one or more human-machine interfaces, a response to the user prompt.

Other example aspects of the present disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

Other example aspects of the present disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

Figure 1:
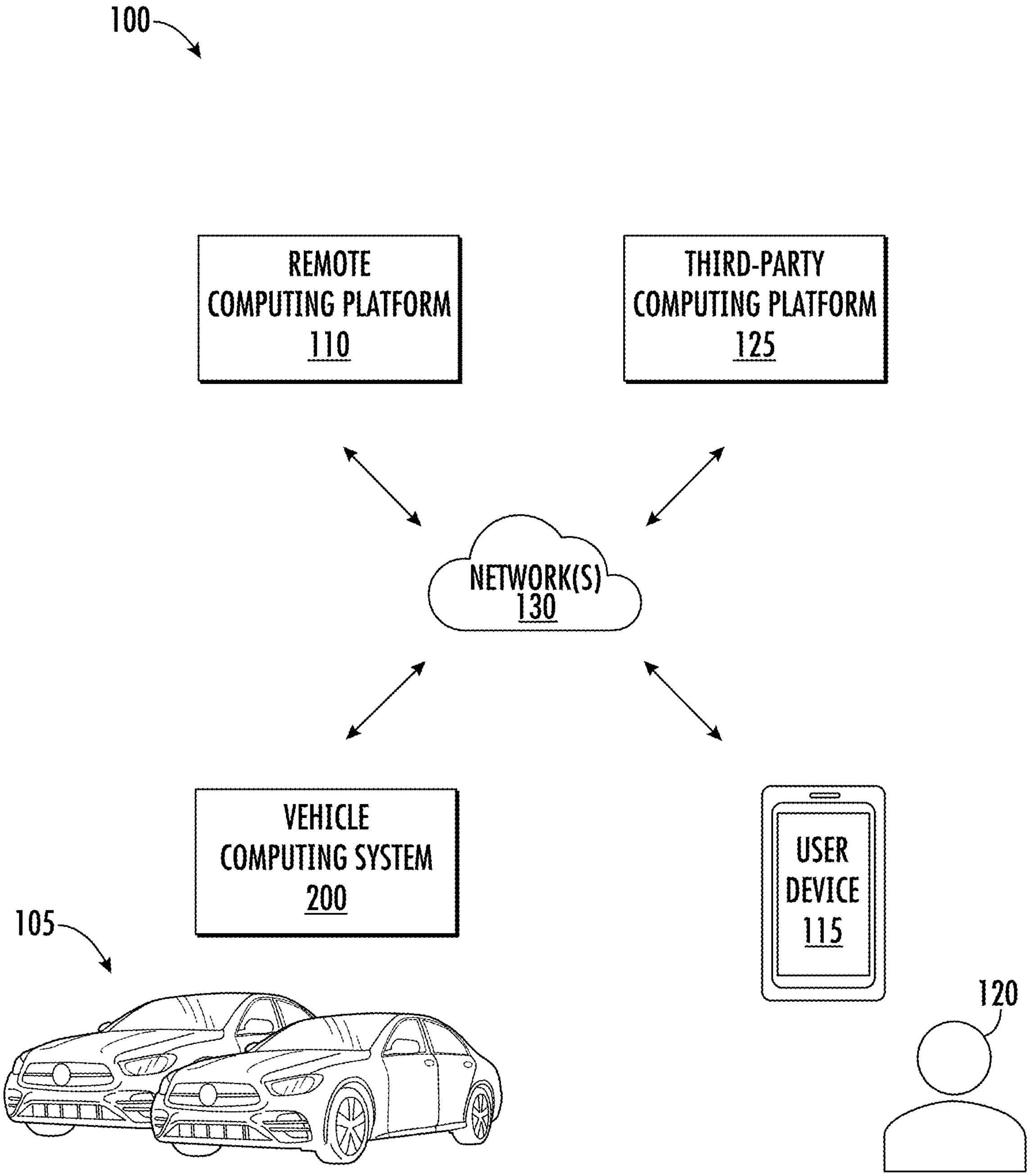
FIG. 1 illustrates an example computing ecosystem according to an embodiment hereof.

An aspect of the present disclosure relates to a method, system, and computer program for customizing computing functions of a vehicle for a user, such as driver or passenger of a vehicle. This is performed using a combination of reasoning and action machine-learned models in a recursive loop to provide a chain of thought reasoning over generated actions and responses to a user prompt. This process can provide a personalized experience within the vehicle for the user.

For instance, in response to a user prompt provided to an in-vehicle voice assistant, one or more machine-learned models may process the user prompt to determine and perform intermediate actions. An intermediate action may include, for example, performing vehicle functions, searching the internet, communicating with other computing systems, etc. At each step, the models may evaluate whether the user prompt has been satisfied based on environmental conditions associated with the user prompt. For example, the models may determine whether intermediate actions implemented iteratively within the vehicle satisfy the user prompt.

In some embodiments, the models may generate a chain of intermediate actions and generate a final response which is implemented within the vehicle. In some embodiments, this functionality and system may enable an in-vehicle voice assistant to effectively respond to multi-command user prompts in a personalized manner.

For example, a user of a vehicle may provide a user prompt (e.g., voice prompts, text messages, etc.) which include natural language commands to a voice assistant within the vehicle. The user prompt may indicate a request for information, activation of a vehicle functions, initiation of a conversation, etc. While the user prompt may provide some indication of a likely desired response, the intent of the user may be unknown to the voice assistant. Moreover, the user prompt may not include contextual information, which if considered may cause a different (e.g., personalized) response to be generated. For instance, this gap in context may cause the voice assistant to provide an unrelated response or responses which fails to consider environmental context, user preferences, or otherwise satisfy the intent of the user in providing the user prompt.

By way of example, a user prompt requesting weather information may yield a response exclusively focusing on the weather forecast to the exclusion of a potential impact the weather forecast may have on an ensuing drive which may align to the actual intent of the user prompt. Thus, unless a user includes additional context or explicitly describes the conditions associated with the verbal command (e.g., input data), intent, etc., the voice assistant will generate output responses which fail to satisfy the intent of the user resulting in additional user prompts from the user. Moreover, requiring users to describe their intent and all environmental conditions in addition to a user prompt may be impractical or cumbersome to articulate. As mentioned, this may result in multiple user prompts being processed to achieve the same result increasing the utilization of computing resources.

To address this technical problem, the technology of the present disclosure utilizes a master language model agent to determine the intent of the user based on environmental data, determine intermediate actions to satisfy the intent, and iteratively reason over intermediate actions to determine whether the intent of a user prompt has been satisfied. This allows the machine-learned models to personalize the computing function or action associated with the output response. Moreover, this allows for downstream intermediate actions to be abstracted away from the initial processing of the user prompt.

For example, sensors of the vehicle may be used to capture environmental data (e.g., sensor data) including, but not limited to, an image of the user, weather data, a current location of the vehicle, or a timestamp associated with the user prompt. The sensors may be interior vehicle sensors or exterior vehicle sensors. The environmental data may be accessible to the master language model agent as the user prompt is processed. The user prompt can include a verbal command from a vehicle occupant that indicates an anticipated response to a statement or a question. The user prompt and environmental data may be processed by the master language model agent to determine a response to the user prompt. While examples described herein discuss verbal or other audio prompts as being a user prompt, the present disclosure is not limited to such embodiment, and other forms or non-verbal communication may also be used.

By way of example, the voice assistant may receive a first prompt message (e.g., a voice query) from a user of the vehicle. In an embodiment, the voice assistant may be a Mercedes® virtual assistant running on the vehicle. In an embodiment, the voice assistant may include software running on a vehicle computing system of the vehicle. For instance, the voice assistant may be part of an automotive head unit/infotainment system within the vehicle. The voice assistant may be configured to receive the first prompt message using one or more microphones or other sound sensors configured to capture or otherwise sense the voice prompt. The first prompt message may include a question such as "Hey Mercedes®, How do I turn on the seat heating?" Based on the first voice prompt, the voice assistant may leverage a master language model agent to determine that an intent of the user is to turn on the seat heating. For instance, the master language model agent may learn how to control the seat heating function.

The master language model agent may be an agent associated with a Large Language Model (LLM), Natural Language Processing (NLP) system, or any other type of machine-learned models. The master language model agent may process the user prompt and based on environmental data determine an intent of the user. For example, environmental data may indicate the beginning of a fall or winter season with upcoming low temperatures for the next several weeks. Moreover, environmental data may indicate a low (e.g., cold) internal temperature of the car. In response to the user prompt and the environmental data, the master language model agent may determine an intent of the user is to turn on the seat heating.

In an embodiment, the master language model agent may perform a reasoning step, whose result is used to create an intermediate action to turn on the seat heating and also create a second prompt (e.g., a digital/automated message) that is based on the first voice prompt. A reasoning step can include evaluating whether the intermediate action satisfies the intent of the user. For instance, based on a determined intention of the user to turn on the seat heating, the master language model agent may determine based on reasoning over the first voice prompt and the intermediate action of turning on the seat heating a second intent of the user includes learning how to turn on the seat heating in addition to turning on the seat heating. For instance, based on the environmental data indicating upcoming low temperatures for the next several weeks, the master language model agent may determine an intent of the user including learning how to turn on the seat heating for future use.

In an embodiment, the master language model agent may create another intermediate action of generating a second prompt (e.g., based on the first prompt) and input the second prompt into the associated LLM. For instance, the second prompt may include a command or request for instructions on methods of activating the seat heating within the vehicle. The LLM may receive the second user prompt and generate response that provides information on how to turn on the seat heating. In an embodiment, the master language model agent may iteratively reason over each intermediate action to determine whether the all intensions of the user have been satisfied and provide a final response back to the user. For instance, the response providing instructions on how to turn on the seat heater may be provided back to the voice assistant within the vehicle where the information may be provided back to the user.

In this manner the master language model agent may automatically reason on a series of intermediate actions to ensure that responses (e.g., or actions performed) are personalized or tailored to the user while considering the environmental context surrounding the user prompt. Additionally, the technology of the present disclosure enables multi-command user prompts to be seamlessly processed. For instance, the master language model agent may modularize the user prompt based on each command and iteratively reason over each command independently. In some embodiments, multi-command user prompts may be processed sequentially allowing context from previous reasoning iterations to be leveraged in downstream reasoning steps to further personalize responses.

While examples herein describe intermediate actions as performing vehicle functions and generating verbal responses, the present disclosure is not limited to such embodiment and intermediate actions may include a plurality of actions such as, but not limited to interacting with other agents that are associated with machine-learned models, accessing data from remote computing systems, generating and transmitting requests (e.g., API requests, etc.) for other computing systems, etc.

Accordingly, the technology of the present disclosure enables a framework where a plurality of intermediate actions may occur independent of the processing of the user prompt creating flexibility and scalability in integrations with various systems.

The technology of the present disclosure may also improve the energy usage and onboard computing technology of the vehicle. For instance, the vehicle may automatically reason over whether a response to a user prompt will sufficiently satisfy the user prompt. By determining intermediate actions, reasoning over the result of the intermediate action, and considering environmental context, the voice assistant provides initial accurate responses which satisfies the user prompt. By providing an initial response which is both accurate and tailored to the user, the vehicle computing system may avoid spending its own energy or computing resources to repetitively receive prompts, transmit the user prompts, and receive output responses due to poor quality responses that fail to consider the context associated with the user's request. This may allow the vehicle to reduce the usage of the vehicle's batteries by reducing the load on the vehicle's onboard computing memory, processing, and communication resources. This allows the vehicle to drive longer and operate its core functions in a more energy-efficient manner.

In another embodiment, the master language model agent may persist in a computing system remote from the vehicle (e.g., cloud-based system, etc.). For instance, the in-vehicle voice assistant may provide the user prompt and environmental data to a cloud based master language model agent, where the user prompt may be processed. In response to the user prompt and environmental data, the cloud-based master language model agent may implement one or more intermediate actions within the vehicle and provide a response. In this manner, the vehicle computing system may avoid spending its own energy or computing resources to process user prompts and curate tailored responses and actions for the user.

In yet another embodiment, by iteratively reasoning over intermediate actions and generating modified or digital prompts to LLMs, the computing efficiency of LLMs may be increased. For instance, the additional context of a digitally generated prompt by the master language model agent may facilitate faster processing for LLMs by increasing the efficiency of probability estimations for decoded responses. By way of example, additional context provided to the LLM by way of the modified or digitally generated prompt allows the LLM to have greater confidence and efficiency during the decoding process where, for example, token sequences (e.g., verbal output responses) are determined, song or playlist selection are determined, etc. because the LLMs may rely on the additional context to narrow the candidate tokens that may be associated with a candidate output response.

In some examples, the master language model agent and the LLMs may be trained to improve the computing customization over time. By way of example, the master language model agent may analyze environmental data including an image of an user and generate a user profile for the user. The user profile may maintain preferences, sentiments, or behavioral trends of the user. Based on the environmental data and the user profile, the master language model agent may more effectively determine the intent of the user over time. For instance, intermediate actions and digitally generated prompts may increase in accuracy over time. In this manner, the computing resources of the master language model agent and the LLMs may decrease over time as the master language model agent and the LLMs learn to determine the intent of the user more efficiently. Moreover, the vehicle computing system (e.g., or cloud-based system) can more efficiently utilize its computing resources, as well as reduce energy overtime otherwise expended predicting the intensions of users.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be the owner of the vehicle or a vehicle occupant. In some implementations, the user 120 may be a user intending to operate the vehicle. In some implementations, the computing ecosystem 100 may include a third party (3P) computing platform 125, as further described herein. The vehicle 105 may include a vehicle computing system 200 located onboard the vehicle 105. The computing platform 110, the user device 115, the third party computing platform 125, and/or the vehicle computing system 200 may be configured to communicate with one another via one or more networks 130.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an OEM that is responsible for the make and model of the vehicle 105. In another example, the computing platform 110 may be associated with a service entity contracted by the OEM to operate a cloud-based server system that provides computing services to the vehicle 105.

The computing platform 110 may include one or more back-end services for supporting the vehicle 105. The services may include, for example, tele-assist services, navigation/routing services, performance monitoring services, Large Language Models (LLMs) etc. In an embodiment, the computing platform 110 may provide processing capabilities to the vehicle 105. For instance, the computing platform 110 may process user prompts provided by the user 120 within the vehicle 105 and return a response. The computing platform 110 may host or otherwise include one or more APIs for communicating data to/from a computing system of the vehicle 105 (e.g., vehicle computing system 200) or the user device 115. The computing platform 110 may include one or more inter-service APIs for communication among its microservices. In some implementations, the computing platform may include one or more RPCs for communication with the user device 115.

The computing platform 110 may include one or more computing devices. For instance, the computing platform 110 may include a control circuit and a non-transitory computer-readable medium (e.g., memory). The control circuit of the computing platform 110 may be configured to perform the various operations and functions described herein. Further description of the computing hardware and components of computing platform 110 is provided herein with reference to other figures.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone (e.g., voice commands), a camera or other imaging device, a motion sensor (e.g., physical commands), etc. The user device 115 may include one or more output components such as a display device (e.g., display screen), a speaker, etc.

In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the vehicle computing system 200, computing platform 110, etc.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different than the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated with an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), open sourced/commercial LLMs, or other types of services. The third-party computing platform 125 may host or otherwise include one or more APIs for communicating data to/from the third-party computing system 125 to other systems/devices of the ecosystem 100.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle may include one or more interior vehicle sensors such as imaging sensors, tactile sensors, audio sensors, etc. configured to capture sensor data of vehicle occupants. The interior of the vehicle 105 may include a display device such as a display screen associated with an infotainment system, as further described with respect to FIG. 3.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc. The vehicle 105 may include one or more sensors for detecting the surrounding environment the vehicle 105 and sensing the vehicle interior. For instance, the vehicle 105 may include one or more camera sensors, temperature/weather sensors, tactile sensors, etc. to detect objects or conditions within the vehicle interior and the surrounding environment of the vehicle 105.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium, which may be external to the computing system, may act as an external buffer or repository for storing information. In such an example, the computing system may retrieve or otherwise receive the information from the non-transitory computer-readable medium.

Certain routine and conventional components of vehicle 105 (e.g., an engine) are not illustrated and/or discussed herein for the purpose of brevity. One of ordinary skill in the art will understand the operation of conventional vehicle components in vehicle 105.

The vehicle 105 may include a vehicle computing system 200. As described herein, the vehicle computing system 200 is onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

Figure 2A:
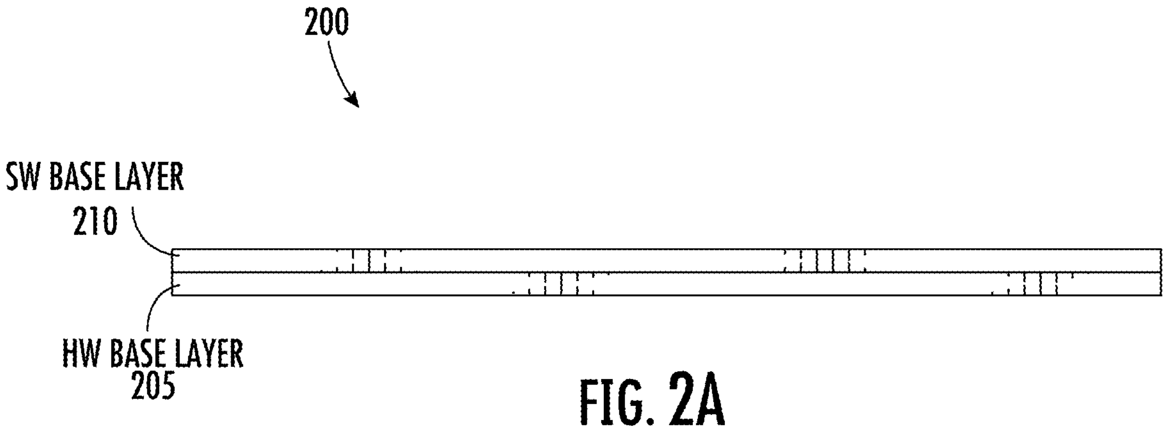
FIGS. 2A-D illustrate diagrams of an example computing architecture for an onboard computing system of a vehicle according to an embodiment hereof.

FIG. 2A illustrates an overview of an operating system of the vehicle computing system 105. The operating system may be a layered operating system. The vehicle computing system 200 may include a hardware layer 205 and a software layer 210. The hardware and software layers 205, 210 may include sub-layers. In some implementations, the operating system of the vehicle computing system 200 may include other layers (e.g., above, below, or in between those shown in FIG. 2A). In an example, the hardware layer 205 and the software layer 210 can be standardized base layers of the vehicle's operating system.

Figure 2B:
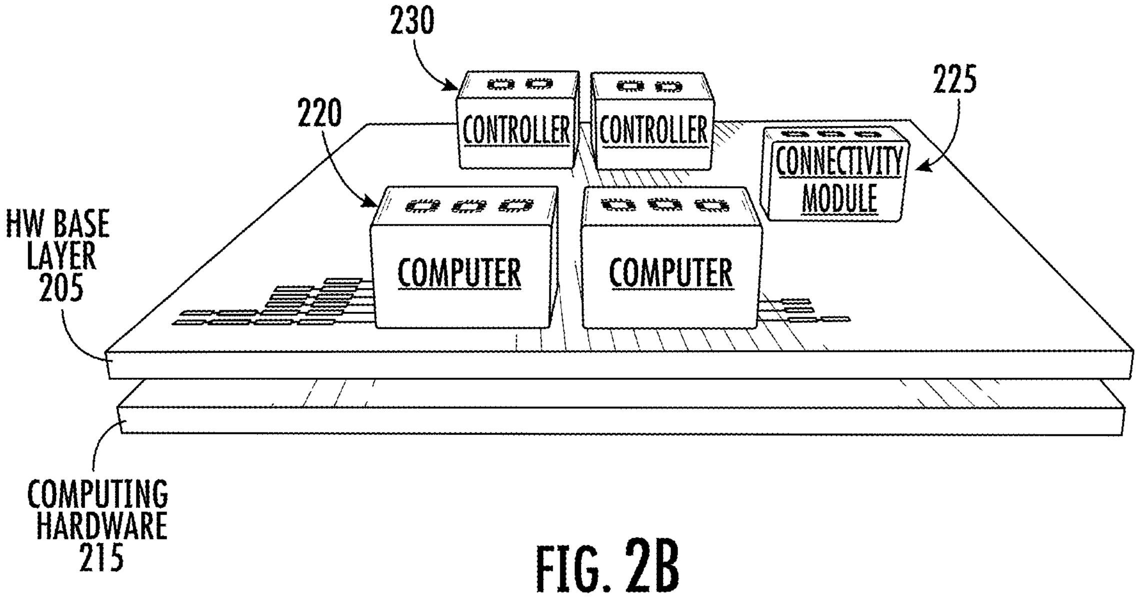

FIG. 2B illustrates a diagram of the hardware layer 205 of the vehicle computing system 200. In the layered operating system of the vehicle computing system 200, the hardware layer 205 can reside between the physical computing hardware 215 onboard the vehicle 105 and the software (e.g., of software layer 210) that runs onboard the vehicle 105.

The hardware layer 205 may be an abstraction layer including computing code that allows for communication between the software and the computing hardware 215 in the vehicle computing system 200. For example, the hardware layer 205 may include interfaces and calls that allow the vehicle computing system 200 to generate a hardware-dependent instruction to the computing hardware 215 (e.g., processors, memories, etc.) of the vehicle 105.

The hardware layer 205 may be configured to help coordinate the hardware resources. The architecture of the hardware layer 205 may be serviced oriented. The services may help provide the computing capabilities of the vehicle computing system 105. For instance, the hardware layer 205 may include the domain computers 220 of the vehicle 105, which may host various functionality of the vehicle 105 such as the vehicle's intelligent functionality. The specification of each domain computer may be tailored to the functions and the performance requirements where the services are abstracted to the domain computers. By way of example, this permits certain processing resources (e.g., graphical processing units) to support the functionality of a central in-vehicle infotainment computer for rendering graphics across one or more display devices for navigation, games, etc. or to support an intelligent automated driving computer to achieve certain industry assurances.

The hardware layer 205 may be configured to include a connectivity module 225 for the vehicle computing system 200. The connectivity module may include code/instructions for interfacing with the communications hardware of the vehicle 105. This can include, for example, interfacing with a communications controller, receiver, transceiver, transmitter, port, conductors, or other hardware for communicating data/information. The connectivity module 225 may allow the vehicle computing system 200 to communicate with other computing systems that are remote from the vehicle 105 including, for example, the computing platform 110 (e.g., an OEM cloud platform).

The architecture design of the hardware layer 205 may be configured for interfacing with the computing hardware 215 for one or more vehicle control units 230. The vehicle control units 230 may be configured for controlling various functions of the vehicle 105. This may include, for example, a central exterior and interior controller (CEIC), a charging controller, or other controllers as further described herein.

Figure 2C:
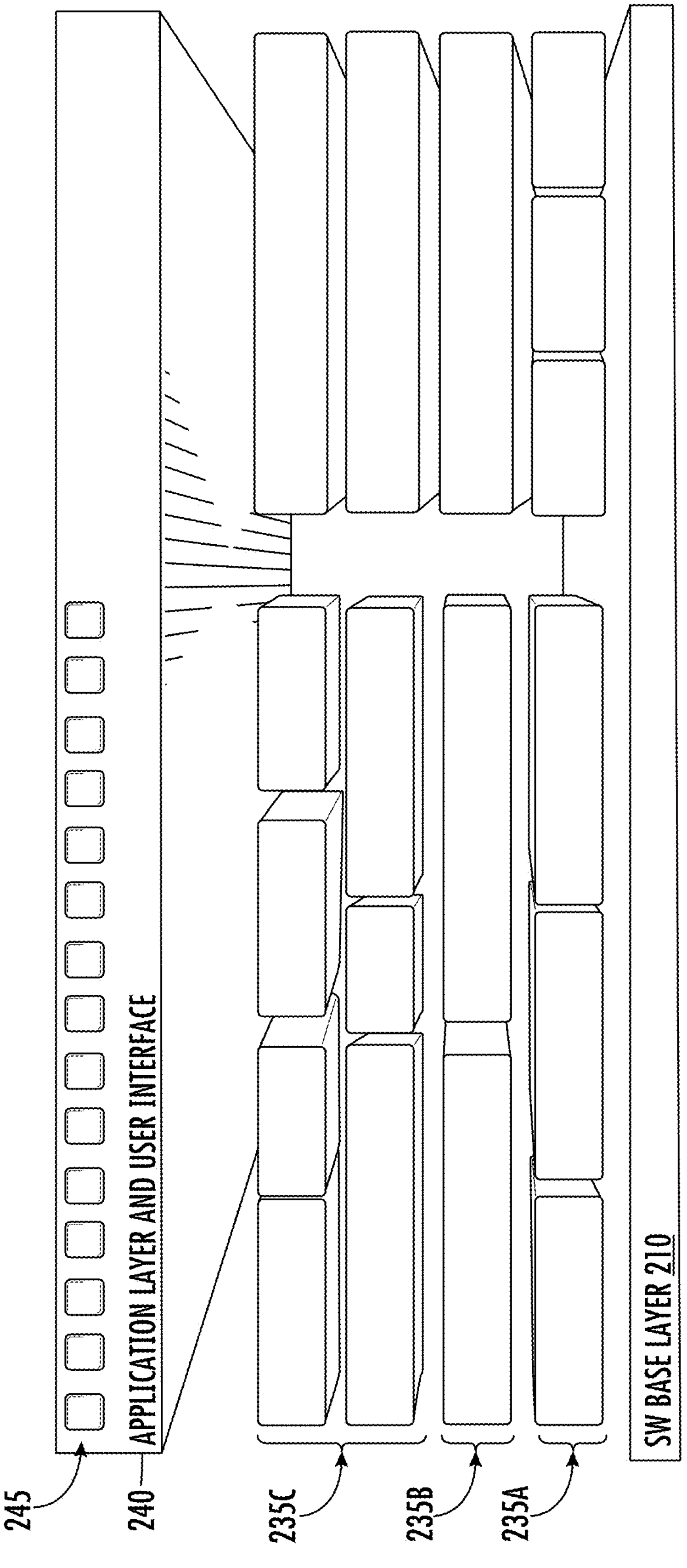

The software layer 210 may be configured to provide software operations for executing various types of functionality and applications of the vehicle 105. FIG. 2C illustrates a diagram of the software layer 210 of the vehicle computing system 200. The architecture of the software layer 210 may be service oriented and may be configured to provide software for various functions of the vehicle computing system 200. To do so, the software layer 210 may include a plurality of sublayers 235A-E. For instance, the software layer 210 may include a first sublayer 235A including firmware (e.g., audio firmware) and a hypervisor, a second sublayer 235B including operating system components (e.g., open-source components), and a third sublayer 235C including middleware (e.g., for flexible integration with applications developed by an associated entity or third-party entity).

The vehicle computing system 200 may include an application layer 240. The application layer 240 may allow for integration with one or more software applications 245 that are downloadable or otherwise accessible by the vehicle 105. The application layer 240 may be configured, for example, using containerized applications developed by a variety of different entities. By way of example, the application layer 240 may include containerized LLMs, voice assistants, etc.

Figure 2D:
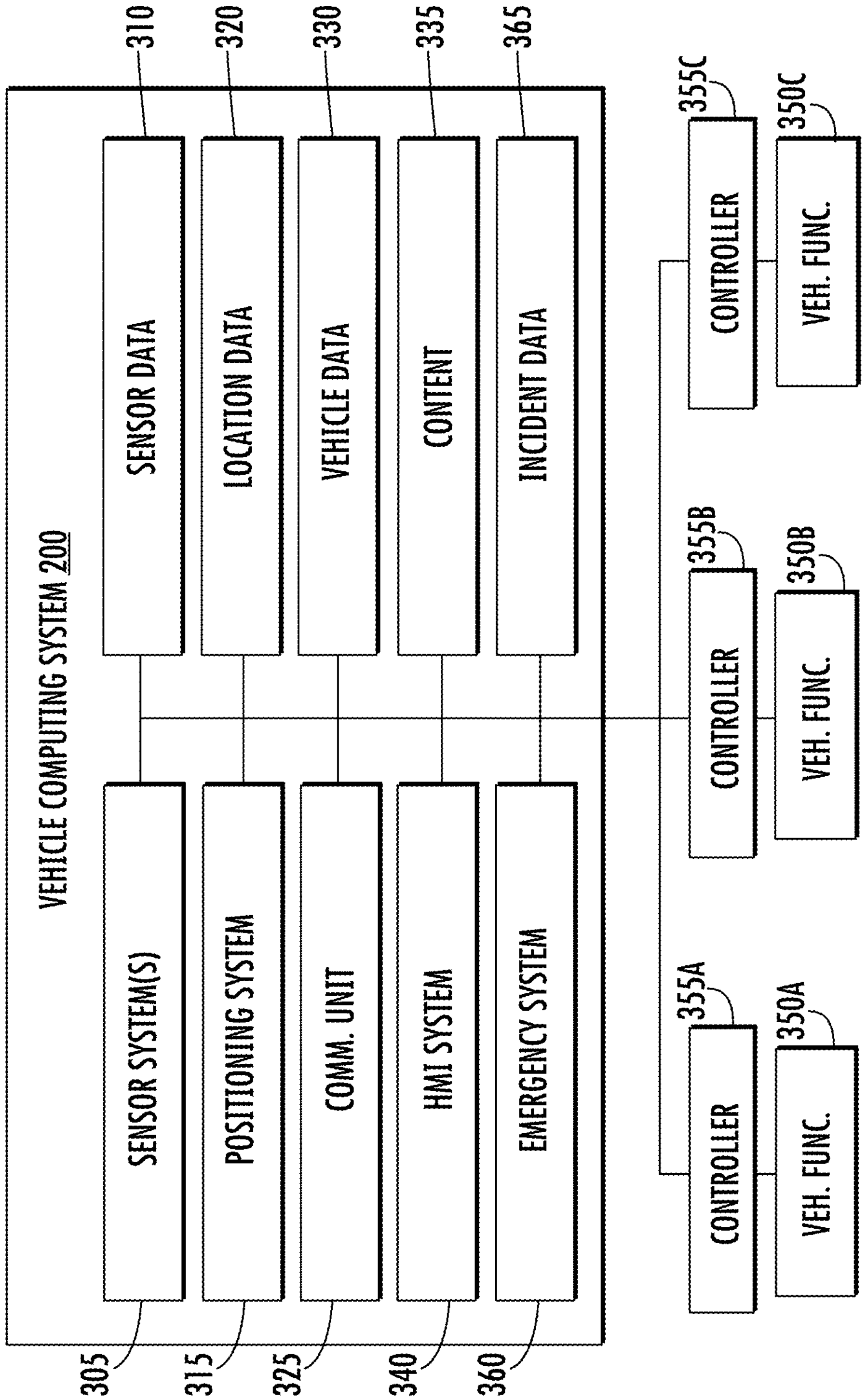

The layered operating system and the vehicle's onboard computing resources may allow the vehicle computing system 200 to collect and communicate data as well as operate the systems implemented onboard the vehicle 105. FIG. 2D illustrates a block diagram of example systems and data of the vehicle 105.

The vehicle 105 may include one or more sensor systems 305. A sensor system 305 may include or otherwise be in communication with a sensor of the vehicle 105 and a module for processing sensor data 310 associated with the sensor configured to acquire the sensor data 305. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, sensors of the vehicle 105 may include exterior sensors for detecting objects or motion within a surrounding environment of the vehicle 105. Sensor data 310 may include image data, data indicative of a vehicle occupant (e.g., user 120, etc.) within or outside the vehicle 105, positions of a user/object within a threshold distance of the vehicle 105, motion/gesture data, audio data, temperature data, tactile data, or other types of data. The sensors may include one or more: cameras (e.g., visible spectrum cameras, infrared cameras), motion sensors, tactile sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on IP address, by using triangulation and/or proximity to network access points or other network components (e.g., cellular towers, WiFi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), parking restrictions, or other traffic signals or control devices/markings (e.g., cross walks); or any other data. The positioning system 315 may localize the vehicle 105 within the environment (e.g., across multiple axes) based on the map data. For example, the positioning system 155 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communications unit 325 configured to allow the vehicle 105 (and its vehicle computing system 200) to communicate with other computing devices. The vehicle computing system 200 may use the communications unit 325 to communicate with the user device 115 or one or more other remote computing devices over a network 130 (e.g., via one or more wireless signal connections). For example, the vehicle computing system 200 may utilize the communications unit 325 to transmit prompts and receive output responses from LLM systems or agents remote from the vehicle 105. This may include, for example, transmitting one or more prompts, modified prompts, etc. (e.g., over the one or more networks 130) and receiving one or more output responses or actions associated with vehicle functions executable by the vehicle computing system 200. For instance, the output response may include, but is not limited to emitting an audio response via one or more vehicle speakers, generating/updating a user interface display within the vehicle 105, adjusting a temperature setting within the vehicle 105, providing an entertainment suggestion, providing a destination suggestion, adjusting a comfort setting with the vehicle 105, etc. An example of vehicle user interface displays is further described with reference to FIG. 3.

Additionally, or alternatively, the vehicle computing system 200 may utilize the communications unit 325 to send vehicle data 335 (e.g., prompts, environmental data, context data, etc.) to the user device 115. The vehicle data 335 may include any data acquired onboard the vehicle 105 including, for example, sensor data 310, location data 320, user input data, or other types of data obtained (e.g., acquired, accessed, generated, downloaded, etc.) by the vehicle computing system 200. For instance, LLMs accessible to the user device 115 may be used to process prompts from the user 120.

In some implementations, the communications unit 325 may allow communication among one or more of the systems on-board the vehicle 105.

In an embodiment, the communications unit 325 may utilize various communication technologies such as, for example, Bluetooth low energy protocol, radio frequency signaling, or other short range or near filed communication technologies. The communications unit 325 may include any suitable components for interfacing with one or more networks, including, for example, transmitters, receivers, ports, controllers, antennas, or other suitable components that may help facilitate communication.

The vehicle 105 may include one or more human-machine interfaces (HMIs) 340. The human-machine interfaces 340 may include a display device, as described herein. The display device (e.g., touchscreen) may be viewable by a user of the vehicle 105 (e.g., user 120) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats). The human-machine interfaces 340 may present content via a user interface for display to a user 120.

Figure 3:
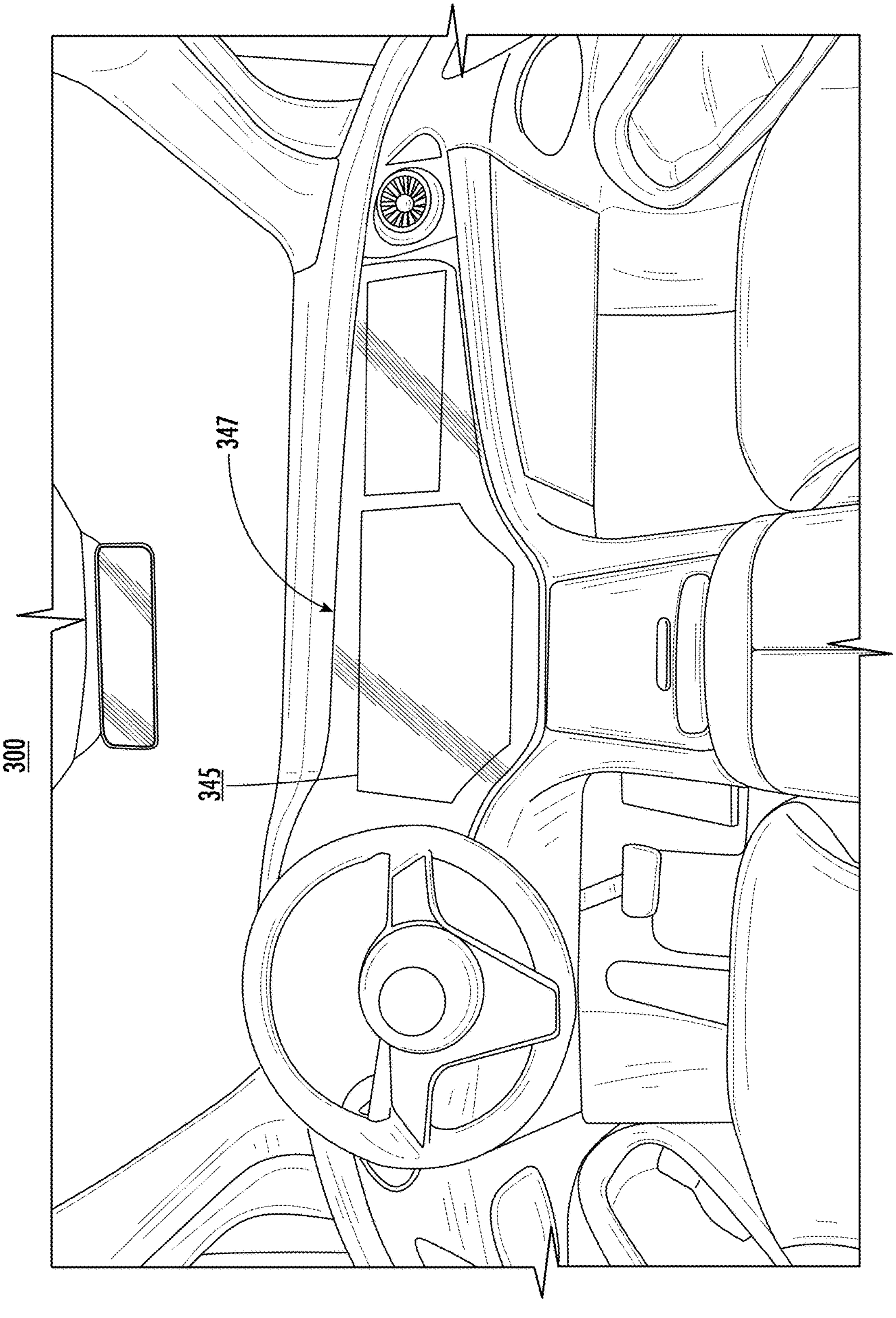
FIG. 3 illustrates an example vehicle interior with an example display according to an embodiment hereof.

FIG. 3 illustrates an example vehicle interior 300 with a display device 345. The display device 345 may be a component of the vehicle's infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like. The display device 345 may be located on, form a portion of, or function as a dashboard of the vehicle 105. The display device 345 may include a display screen, CRT, LCD, plasma screen, touch screen, TV, projector, tablet, and/or other suitable display components.

The display device 345 may display a variety of content to the user 120 including information about the vehicle 105, prompts for user input, outputs in response to user prompts, etc. The display device 345 may include a touchscreen through which the user 120 may provide user input to a user interface.

For example, the display device 345 may include user interface rendered via a touch screen that presents various content. The content may include vehicle speed, mileage, fuel level, charge range, navigation/routing information, audio selections, streaming content (e.g., video/image content), internet search results, comfort settings (e.g., temperature, humidity, seat position, seat massage), or other vehicle data 335. The display device 345 may render content to facilitate the receipt of user input. For instance, the user interface of the display device 345 may present one or more soft buttons with which a user 120 can interact to adjust various vehicle functions (e.g., navigation, audio/streaming content selection, temperature, seat position, seat massage, etc.). Additionally, or alternatively, the display device 345 may be associated with an audio input device (e.g., microphone) for receiving audio input from the user 120.

Returning to FIG. 2D, the vehicle 105 may include an emergency system 360. The emergency system 360 may be configured to obtain incident data 365. The incident data 365 may be indicative of an incident event including the vehicle 105. For example, the incident data 365 may include sensor data 310 from one or more sensors such as an airbag sensor, an impact sensor configured to detect an impact to the vehicle 105 by another object, a sensor configured to detect damaged vehicle components, a sensor configured to detect broken wired or wireless connections, etc. The incident event may include an accident, collision with an object (e.g., other vehicle, tree, guard rail), an unsafe vehicle maneuver (e.g., rollover, swerve offroad), etc. In some implementations, the emergency system 360 may be included in the communications system 325.

The vehicle 105 may include a plurality of vehicle functions 350A-C. A vehicle function 350A-C may be a functionality that the vehicle 105 is configured to perform based on a detected input. The vehicle functions 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The (vi) vehicle entertainment functions may include playing music playlists or interactions with a travel companion. A travel companion can include a virtual or digital system such as a voice assistant that engages in communications with the vehicle occupants during the duration of a drive. For instance, the user 120 may interact with a vehicle function 250A-C through user input (e.g., to voice prompt) that specifies a setting of the vehicle function 250A-C such as the (i) vehicle entertainment function causing an LLM running within the vehicle computing system 200 or remote from the vehicle computing system 200 to engage in a dialogue with the vehicle occupants.

In an embodiment, the vehicle functions 350A-C may be functionality implemented in response to a model output (e.g., LLM, LLM agent, etc.) based on a prompt or modified prompt from a vehicle occupant. For instance, the vehicle owner may request, via a user prompt to a voice assistant, suggestions for dinner. A master language model agent may receive the user prompt, environmental data associated with one or more conditions of the user prompt and generate one or more intermediate actions to satisfy the user prompt. In an embodiment, the master language model agent may iteratively reason over the intermediate actions to determine whether the user prompt has been satisfied and return output responses that may be implemented as vehicle functions 350A-C. An example of a master language model agent processing user prompts is further described with reference to FIGS. 6-8.

Each vehicle function may include a controller 355A-C associated with that particular vehicle function 350A-C. The controller 355A-C for a particular vehicle function may include control circuitry configured to operate its associated vehicle function 350A-C. For example, a controller may include circuitry configured to unlock a door, turn on the ignition, turn the seat heating function on, turn the seat heating function off, set a particular temperature or temperature level, etc.

In an embodiment, a controller 355A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust the temperature function of the vehicle 105 to lower the temperature of the vehicle interior.

The controllers 355A-C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). In another example, such data may be used to provide additional context to supplement user prompts. Additionally, or alternatively, such data can be included in vehicle data 335 and transmitted to the remote computing platform 110.

Figure 4:
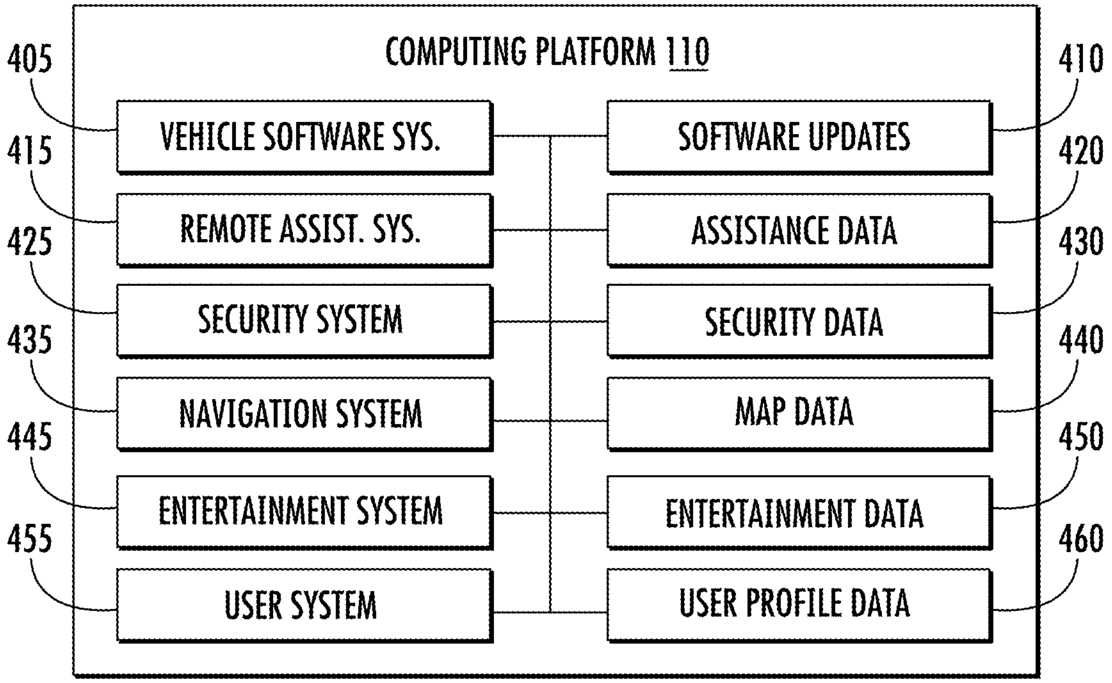
FIG. 4 illustrates a diagram of an example computing platform that is remote from a vehicle according to an embodiment hereof.

FIG. 4 illustrates a diagram of computing platform 110, which is remote from a vehicle according to an embodiment hereof. As described herein, the computing platform 110 may include a cloud-based computing platform.

In some implementations, the computing platform 110 may be implemented on a server, combination of servers, or a distributed set of computing devices which communicate over a network (e.g., network 130). For instance, the computing platform 110 may be distributed using one or more physical servers, private servers, or cloud computing. In some examples, the computing platform 110 may be implemented as a part of or in connection with one or more microservices, where, for example, an application is architected into independent services that communicate over APIs. Microservices may be deployed in a container (e.g., standalone software package for a software application) using a container service, or on VMs (virtual machines) within a shared network. Example, microservices may include a microservice associated with the vehicle software system 405, remote assistance system 415, etc. A container service may be a cloud service that allows developers to upload, organize, run, scale, manage, and stop containers using container-based virtualization to orchestrate their respective actions. A VM may include virtual computing resources which are not limited to a physical computing device. In some examples, the computing platform 110 may include or access one or more data stores for storing data associated with the one or more microservices. For instance, data stores may include distributed data stores, fully managed relational, NoSQL, and in-memory databases, etc.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle 105 (e.g., for AV assistance), remotely accessing the vehicle 105 (e.g., remote authorizations), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc. In some implementations, the assistance data 420 may include the vehicle data 335. In other implementations, the assistance data 420 may include data such as the vehicles owner manual. For instance, the assistance data 420 may include instructions on all vehicle functions or operations and provide detailed information on the use of operations of the vehicle 105 (e.g., climate controls, seat controls, vehicle controls, configurations, etc.).

The remote assistance system 415 may transmit data or command signals to provide assistance to the vehicle 105. This may include providing data indicative of relevant charging locations, remote control commands to move the vehicle, personalized recommendations, etc.

The computing platform 110 may include a security system 425. The security system 425 can be associated with one or more security-related functions for accessing the computing platform 110 or the vehicle 105. For instance, the security system 425 can process security data 430 for identifying vehicle occupancy, data encryption, data decryption, etc. for accessing the services/systems of the computing platform 110. Additionally, or alternatively, the security system 425 can store security data 430 associated with the vehicle 105. A user 120 can request authorization to access or operate the vehicle 105 (e.g., by approaching the vehicle 105, touching the vehicle, voice commands, etc.). In the event the user 120 has a magnetic key for the vehicle 105 as indicated in the security data 430, the security system 425 can provide a signal to perform one or more vehicle functions 350A-C based on a predetermined authorization profile associated with the magnetic key.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine the location of the vehicle 105, a point of interest, etc. The navigation system 435 may also provide routes to destinations requested by the vehicle 105 (e.g., via user input to the vehicle's head unit). The routes can be provided as a portion of the map data 440 or as separate routing data. Data provided by the navigation system 435 can be presented as content on the display device 345 of the vehicle 105.

In an embodiment, personalized destinations may be determined by the navigation system 435 based on output responses from an LLM. For instance, a master language model agent may receive a user prompt and environmental data indicating conditions associated with a request for suggested destination. The master language model agent may facilitate personalized responses by communicating with an LLM, other agents, remote computing systems, etc. to generate an output response that considers the intent of the user prompt, and the environmental conditions associated with the user prompt. The output response can be implemented by causing the navigation system 435 to provide routes to personalized destinations based on the master language model agent processing the user prompt and reasoning over an action to activate the navigation system.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system associated with a third-party service provider of entertainment content. The entertainment data 450 may include media content such as music, videos, gaming data, etc. The entertainment data 450 may be provided to vehicle 105, which may output the entertainment data 450 as content via one or more output devices of the vehicle 105 (e.g., display device, speaker, etc.). In an embodiment, the entertainment system 445 may facilitate a travel companion experience for the user 120 during the duration of a trip.

The computing platform 110 may include a user system 455. The user system 455 may create, store, manage, or access user profile data 460. The user profile data 460 may include a plurality of user profiles, each associated with a respective user 120. A user profile may indicate various information about a respective user 120 including the user's preferences (e.g., for music, comfort settings, parking preferences), frequented/past destinations, past routes, etc. The user profiles may be stored in a secure database. In some implementations, when a user 120 enters the vehicle 105, the user's key (or user device 115) may provide a signal with a user 120 or key identifier to the vehicle 105. In an embodiment, sensor data 305 which includes the user 120 may be used to update the user profile data 460. For instance, sensor data 305 may be analyzed to determine an intent of a user prompt provided by the user 120. The intent of the user 120 may be stored as user profile data 460.

The vehicle 105 may transmit data indicative of the identifier (e.g., via its communications system 325) to the computing platform 110. The computing platform 110 may look-up the user profile of the user 120 based on the identifier and transmit user profile data 460 to the vehicle computing system 200 of the vehicle 105. The vehicle computing system 200 may utilize the user profile data 460 to implement preferences of the user 120, present past destination locations, etc. In an embodiment, the user profile data 460 may be used by a master language model agent to generate modified prompts which considers the preferences, intent, etc. of the user 120. The user profile data 460 may be updated based on information periodically provided by the vehicle 105. In some implementations, the user profile data 460 may be provided to the user device 115.

Figure 5:
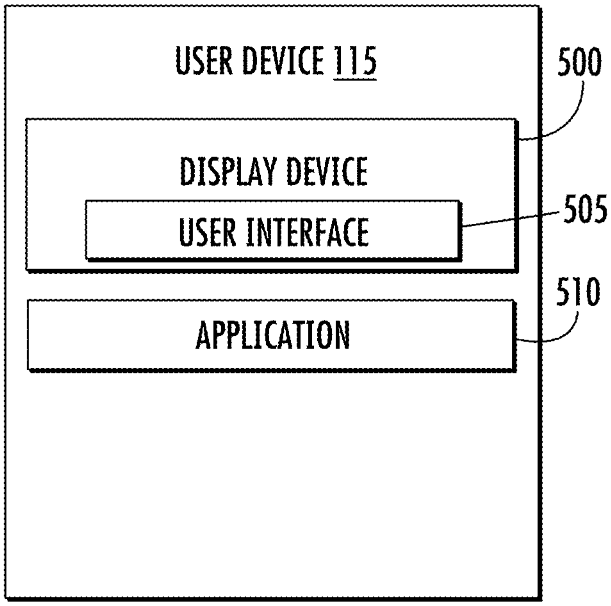
FIG. 5 illustrates a diagram of an example user device according to an embodiment hereof.

FIG. 5 illustrates a diagram of example components of user device 115 according to an embodiment hereof. The user device 115 may include a display device 500 configured to render content via a user interface 505 for presentation to a user 120. The display device 500 may include a display screen, AR glasses lens, smart watch, CRT, LCD, plasma screen, touch screen, TV, projector, tablet, or other suitable display components. The user device 115 may include a software application 510 that is downloaded and runs on the user device 115. In some implementations, the software application 510 may be associated with the vehicle 105 or an entity associated with the vehicle 105 (e.g., manufacturer, retailer, maintenance provider). In an example, the software application 510 may enable the user device 115 to communicate with the computing platform 110 and the services thereof.

The user device 115 may be configured to pair with the vehicle 105 via a short-range wireless protocol. The short-range wireless protocol may include, for example, at least one of Bluetooth®, Wi-Fi, ZigBee, UWB, IR. The user device 115 may pair with the vehicle 105 through one or more known pairing techniques. For example, the user device 115 and the vehicle 105 may exchange information (e.g., IP addresses, device names, profiles) and store such information in their respective memories. Pairing may include an authentication process whereby the user 120 validates the connection between the user device 115 and the vehicle 105. In some examples, the user device 115 may be configured to pair with the vehicle 105 over one or more networks 130 such as the internet. For instance, the user device 115 may be remote from the vehicle 105 and pair with the vehicle 105 over a network 130.

Once paired, the vehicle 105 and the user device 115 may exchange signals, data, etc. through the established communication channel. For example, the head unit 347 of the vehicle 105 may exchange signals with the user device 115.

The technology of the present disclosure allows the vehicle computing system 200 to preserve its computing resources by processing user prompts received by a voice assistant using a master language model agent to determine and iteratively reason over intermediate actions to determine whether the user prompt has been satisfied. For instance, intermediate actions may include communication with other agents, sending requests to remote computing systems, performing vehicle functions, generating digital or automated LLM prompts, etc. An orchestrator may facilitate the implementation of the intermediate actions allowing the master language model agent to focus on reasoning over the result of the intermediate action. The master language model agent may reason over intermediate actions to determine whether additional intermediate actions are needed or whether the user prompt has been satisfied. This abstracts the logic needed to perform the intermediate actions away from the voice assistant and master language model agent allowing the voice assistant to receive user prompts or hands free commands within the vehicle 105 and providing a personalized action or response in an initial response. This preserves computing resources otherwise consumed processing multiple user prompts to yield the same result.

Examples described herein reference a vehicle owner as a vehicle occupant that may prompt a digital voice assistant within the vehicle 105. This is meant for example purposes only and is not meant to be limiting. Other parties associated with the vehicle 105 may provide prompts and other forms of communicating prompts may be used. This can include users 120 that are outside the vehicle, users 120 that type messages via the user device 115, display device 345, etc. or communicate using gestures such as sign language, etc. For instance, the user 120 may provide prompts via the user device 115.

As described herein, this technology can overcome potential inefficiencies and complexities introduced by training a voice assistant or singular machine-learned model to reason over user prompts, determine actions and response, and implement actions. For instance, a single model trained to generate personalized responses and reason over the quality of the response may be overly complex and difficult to scale to with respect to implementing a wide variety of actions to satisfy or personalize a response to a user prompt.

Moreover, the technology can overcome potential inefficiencies introduced by failing to consider environmental data associated with user prompts and failing to consider whether a generated response has satisfied the intent of the user 120. By way of example, existing LLMs which operate as part of a third-party service (e.g., third-party computing platform 125) may be stateless. A stateless LLM may process each prompt as a standalone interaction without remembering past or previous interactions. This can create complexities in generating personalized user experiences because previous interactions and environmental context may not be considered when decoding a future response. Aspects of the present disclosure allow even stateless LLMs to generate personalized output responses by providing the LLM with additional context (e.g., environmental data, reasoning outcomes, etc.) to influence the LLM to generate an output response that is tailored to the user 120 or circumstances.

Figure 6:
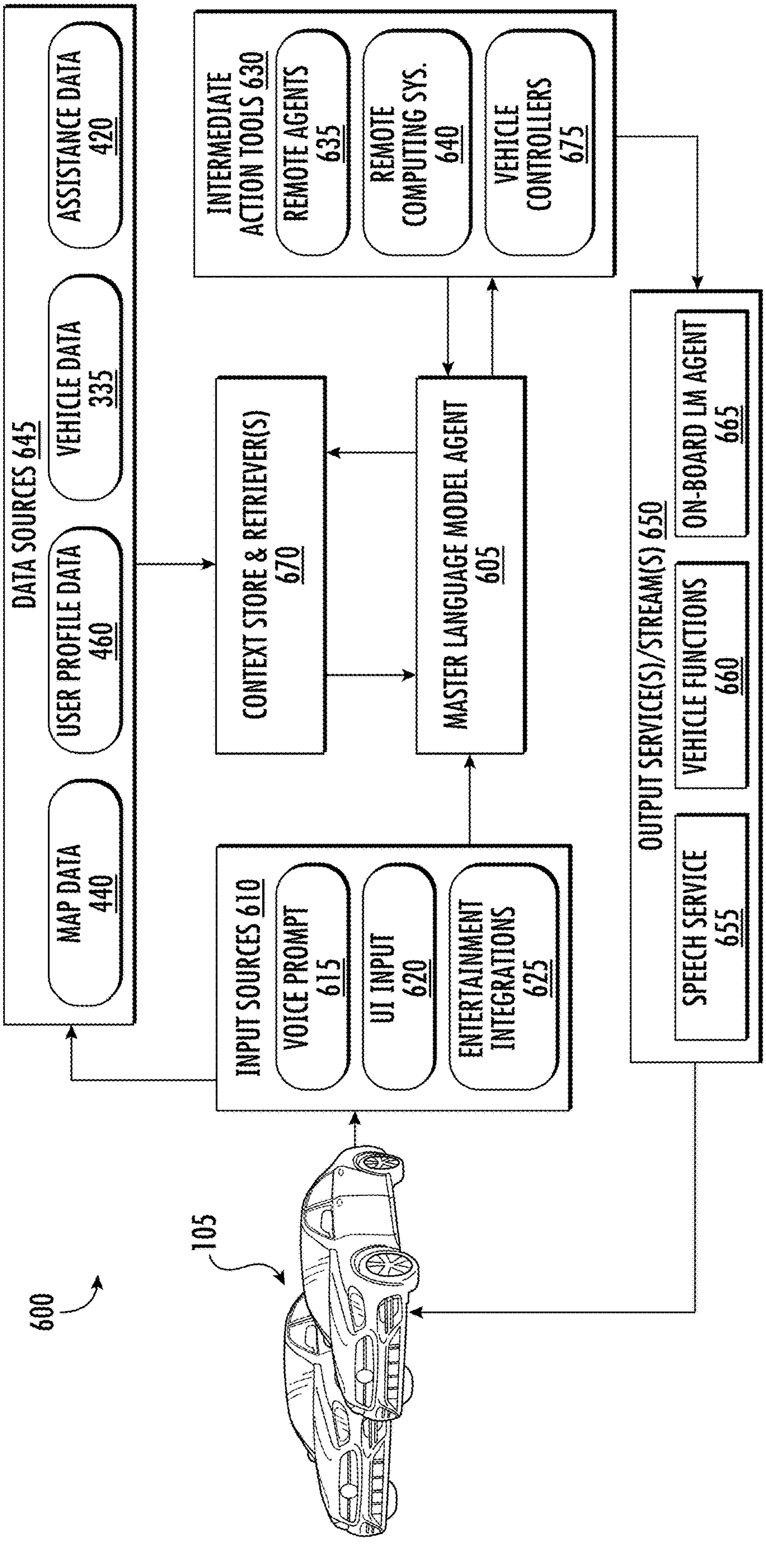
FIG. 6 illustrates an example dataflow pipeline according to an embodiment hereof.

FIG. 6 illustrates an example dataflow pipeline according to an embodiment hereof. The following description of dataflow in data pipeline 600 is described with an example implementation in which a master language model agent 605 processes data from one or more input sources 610 from the vehicle 105 and utilizes intermediate action tools 630 to implement one or more intermediate actions in response to the input sources 610. The master language model agent 605 may consider various data sources 645 by accessing or retrieving environmental data or context data from a context store 670 and retrievers.

Based on the input sources and data accessed from the context store 670 and retrievers, the master language model agent 605 may iteratively reason over whether the result of intermediate actions taken have satisfied the input source 610. For instance, the master language model agent 605 may implement one or more actions using one or more intermediate action tools 630 causing the intermediate action tools 630 to initialize one or more response output services/stream 650. The response output services/stream 650 may cause an action or event to occur within the vehicle 105 and the master language model agent 605 may reason over the result.

The input sources 610 may include input data provided by a user 120 of the vehicle 105. For instance, the input sources 610 may include voice prompts 615, user interface (UI) inputs 620 (e.g., via the display device 345, user device 115, etc.), or entertainment integrations 625. Example voice prompts 615 may include verbal or audio voice commands (e.g., user prompts), speech-to-text, etc. provided by a user 120. Example UI inputs 620 may include commands provided via a user interface display (e.g., display device 345) including, but not limited to selection of buttons, user interface elements, text messages, etc. Entertainment integrations may include commands proxied through entertainment applications or software such as, but not limited to mobile device (e.g., user device 115) operating systems which integrate with the vehicle 105, AI enabled music applications, AI enabled navigation applications, etc.

The input sources 610 may be received by one or more interior vehicle sensors such as imaging sensors, tactile sensors, audio sensors, etc. configured to capture sensor data of vehicle occupants. By way of example, the user 120 may provide a voice prompt 615 (e.g., user prompt) requesting directions to an airport to a voice assistant within the vehicle. The user prompt may be captured by one or more microphone sensors within the vehicle interior and received by the voice assistant. The voice assistant may provide the voice prompt 615 to the master language model agent 605 for further processing or store one or more portions of the input sources 610 for subsequent or concurrent processing.

For instance, the input sources 610 may be stored as various data sources 645 for additional processing by a context engine. The data sources 645 can include map data 440, user profile data 460, vehicle data 335, assistance data 420, etc. For example, input sources 610 which include a user prompt provided by the user 120 may be stored as map data 440 where a user 120 requests directions to the airport or other location. In another example, input sources 610 may be stored as both map data 440 and user profile data 460 if a user prompt indicates the airport or other location as a semantic location (e.g., work, home, travel, etc.), or the user 120 frequently visits the location. In another example, input sources 610 may be stored as vehicle data 335 based on being captured by vehicle sensors, activating vehicle functions, etc. In yet another example, input sources 610 may be stored as assistance data 420 if a user prompt requests assistance with the vehicle 105 or a vehicle function.

The context store 670 and retrievers may include data processed from the various data sources 645. For instance, a machine-learned context engine (not shown) may process the data from the various data sources 645 and extract additional context (e.g., environmental data) from the data sources 645 that are relevant or associated with the input sources 610 (e.g., user prompts, etc.). The environmental data may be provided to or otherwise accessible to the master language model agent 605 as the master language model agent 605 processes the user prompt from the input sources 610. By way of example, a stateless LLM tasked with generating a personalized response to a voice prompt 615 may be provided with environmental data (e.g., by the master language model agent 605) to narrow or refine candidate tokens to include in a response.

In an embodiment, the context engine may be software running on one or more servers. For instance, the context engine may include software running on one or more servers within the vehicle computing system 200, the remote computing platform 110, the user device 115, or the third-party computing platform 125. In an embodiment, the context engine may include a standalone system that communicates with the vehicle 105 and the master language model agent 605 over a network (e.g., network 130). In some embodiments, the context engine may be an agent which communicates with the master language model agent 605. In other embodiments, the context engine may be a function of the master language model agent 605.

The context engine may include one or more machine-learned models that process data from the data sources 645 to extract environmental data associated with user prompts provided to the master language model agent 605. For example, the context engine may include a voice analysis model, an image analysis model, a sentiment analysis model, etc. configured to process data stored within the various data sources 645 and extract relevant environmental data.

By way of example, the context engine may be configured to extract, concatenate, or otherwise determine relevant data associated with a user prompt from the various data sources 645. For instance, the context engine may extract sensor data which includes a time stamp within a threshold time from a time the user prompt was provided. In another example, the context engine may determine the user prompt is associated with a user routine and concatenate previous user behaviors and user behaviors captured near a time the user prompt was provided and generate environmental data indicating the user prompt is associated with a routine to provide to the master language model agent 605. In yet another example, the context engine may extract temperature data associated with the vehicle interior or exterior to determine a level of adjustment of climate controls in response to user prompt to make the vehicle 105 "comfortable".

Environmental data may include information associated with the user 120, vehicle 105 (e.g., interior configuration of the vehicle, environmental conditions, etc.), or any other information which may be related to user prompts. For instance, examples of environmental data may include, but are not limited to interior or exterior temperature of the vehicle 105, location or pose of the vehicle 105, time of day/day of week, sentiments of the user (e.g., based on sentiment analysis), user routines (e.g., based on user profile data 460), etc. The environmental data may be provided to the master language model agent 605 in addition to the user prompt to determine an intent of the user prompt or otherwise determine whether a user prompt has been satisfied.

The master language model agent 605 may be an unsupervised or supervised learning model configured to detect the tone, emotion, or intent of a vehicle occupant (e.g., providing a user prompt), determine one or more intermediate actions which satisfies the intent, and reason over whether the user prompt has been satisfied based on the result of the intermediate actions taken. In some examples, the master language model agent 605 may include one or more machine-learned models. For example, the master language model agent 605 may include a machine-learned model trained to analyze environmental data or context associated with a voice prompt 615 (e.g., user prompt) and determine a corresponding action which satisfies an intent associated with the user prompt. In some examples, the master language model agent 605 may include a machine-learned model trained to detect the speech content included within the user prompt. In some examples, the master language model agent 605 may include a machine-learned model trained to distinguish multiple occupants of the vehicle 105 from each other by executing audio segmentation techniques. In other examples, the master language model agent 605 may be an agent of a machine-learned large language model trained to generate actions or responses to user prompts.

The master language model agent 605 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

The master language model agent 605 may be trained through the use of one or more model trainers and training data. The model trainers may be trained using one or more training or learning algorithms. One example training technique is backwards propagation of errors. Another example of building and training technique is employing TensorFlow and PyTorch. In some examples, simulations may be implemented for obtaining the training data or for implementing the model trainer(s) for training or testing the model(s). In some examples, the model trainer(s) may perform supervised training techniques using labeled training data. As further described herein, the training data may include labelled audio segments that have labels indicating users 120, intent expressions, etc. In some examples, the training data may include simulated training data (e.g., training data obtained from simulated scenarios, inputs, configurations, various acoustic settings, etc.). In some examples, the training may include noise-cancellation training and reinforcement learning for refining command recognition accuracy. Other examples may include using hyperparameters such as learning rate, batch size, and optimizing epochs using grid search and Bayesian optimization techniques.

Additionally, or alternatively, the model trainer(s) may perform unsupervised training techniques using unlabeled training data. By way of example, the model trainer(s) may train one or more components of a machine-learned model to perform voice detection and voice analysis through unsupervised training techniques using an objective function (e.g., costs, rewards, heuristics, constraints, etc.). In some implementations, the model trainer(s) may perform a number of generalization techniques to improve the generalization capability of the model(s) being trained. Generalization techniques include weight decays, dropouts, or other techniques.

By way of example, the master language model agent 605 may determine based on environmental data and a user prompt indicating a request for directions to the airport an intention that the user 120 is anticipating the display device 345 to be updated to present directions to the airport. Based on determining the intention of the user 120 is to receive navigation instructions, the master language model agent 605 may utilize the intermediate action tools 630 to implement an intermediate action of presenting navigation instructions to the airport.

The intermediate action tools 630 may include a library of programming tools or computing instructions which may be called to implement various intermediate actions. For instance, the intermediate action tools 630 may include microservices for interacting with APIs of various systems or tools, communication channels with open sourced LLMs, or other communication protocols for interacting, retrieving, or otherwise modifying data within other computing systems. For example, the intermediate action tools 603 may include remote agents 635 (e.g., agents of other LLMs) for interacting with general or specialized LLMs, remote computing system APIs 640 for retrieving, updating, or providing data, or vehicle controller APIs for interacting with or controlling functions of the vehicle 105. While examples herein describe a few intermediate action tools 630, one of ordinary skill will appreciate that any interaction between computing systems may be implemented.

The master language model agent 605 may communicate with one or more vehicle controller APIs 675. For instance, the master language model agent 605 may transmit one or more computing instructions (e.g., API requests, etc.) to the intermediate action tools 630 to initialize an output service/stream 650 (e.g., based on the API request) which implements the intermediate action of displaying navigation to the airport within the vehicle 105. For example, the vehicle controllers API 675 may call the vehicle functions service 660 and cause the vehicle functions service 660 to communicate command instructions to vehicle controller 355 (e.g., within the vehicle computing system 200) of the vehicle 105. The vehicle functions service 660 may activate the vehicle controller 355 within the vehicle 105 to update a display device 345 within the vehicle to display the navigation instructions to the airport.

In this manner, the master language model agent 605 may be abstracted from the logic used to implement intermediate actions and reason over the result. In an embodiment, an orchestrator may be used to interact with the intermediate action tools 630 and coordinate intermediate actions. An example of an orchestrator is further described with reference to FIG. 7.

In an embodiment, the master language model agent 605 may reason over the intermediate action of displaying the navigation to the airport and determine whether the intent of the user prompt has been satisfied. For instance, the master language model agent 605 may consider environmental data to reason over the intermediate action. By way of example, the context engine may concatenate user profile data 460 indicating the user 120, on a previous trip, provided multiple prompts (e.g., a first prompt seeking directions, second prompt seeking traffic details, third prompt seeking flight status, etc.) to determine whether the user 120 would arrive at the airport on time. Accordingly, the master language model agent 605 may utilize the environmental data to determine the user prompt requesting directions to the airport also includes a second intent to determine whether the user 120 will arrive on time at the airport destination.

In response to determining the second intent of the user prompt the master language model agent 605 may determine a second intermediate action of checking a traffic along the route to the airport and providing traffic updates or alternative routes. In an embodiment, the master language model agent 605 may determine a third intermediate action of querying the airline computing system to determine the flight status of the user's flight to determine whether the flight will depart as scheduled. In yet another embodiment, the master language model agent 605 may access travel agents for the airline to determine if alternative flights are available (e.g., in the event that the user 120 will miss the flight).

For example, the master language model agent 605 may determine an intent of the user prompt, determine and implement an intermediate action, and reason over the result of the action in a recursive loop which maintains the context of previous intermediate actions. In this manner, the master language model agent 605 may determine and implement a series of actions which satisfies the user prompt without the user 120 having to provide additional user prompts through the input sources 610.

In an embodiment, once the master language model agent 605 has determined that the user prompt has been satisfied, a final user response may be provided back to the user 120. By way of example, the master language model agent 605 may determine the user 120 will arrive at the airport close to the departure time of the flight due to traffic, and implement an intermediate action (e.g., via a remote agent 635) to reserve valet parking at the airport providing the user with more time to make the flight. Based on reasoning over whether the valet parking will satisfy an intent of the user 120 to make the upcoming flight, the master language model agent 605 may generate a digital or automated prompt to an LLM indicating the user 120 will arrive at the airport near the departure time of the upcoming flight and that valet parking has been reserved to provide more time for the user 120 to make the flight. The digital or automated prompt may be input into the LLM to generate a tailored response.

For instance, the master language model agent 605 may utilize a remote agent 635 or a vehicle controller API 675 to provide the automated prompt to an on-board LM agent 665 on-board the vehicle 105. The on-board LM agent 665 may include a large language model running on one or more servers of the vehicle computing system 200 of the vehicle 105 or is otherwise accessible to the vehicle 105. In response to the automated prompt, the on-board LM Agent may interact with the language model to generate a response which informs the user 120 of the time of arrival to the airport of and the valet parking reservation.

In an embodiment, a remote language model may receive the automated prompt and initialize the speech service 655 to provide the tailored response to the user 120. For instance, the master language model agent 605 may utilize an open sourced language model via the remote agents 635 to generate a response to the automated prompt. Based on the response generated by the open sourced language model, the speech service 655 may be used to provide an audio response to the user 120 within the vehicle 105. For instance, the speech service 655 may activate the voice assistant within the vehicle 105 to provide the response to the user using one or more speaker sensors within the vehicle 105.

In an embodiment, environmental data may be used to generate context data. Context data may include additional information that supplements user prompts to input a large language model (LLM). For instance, context data may enable the master language model agent 605 to generate more tailored digital or automated prompts to provide to an LLM. By way of example, based on environmental data indicating the user 120 intends to determine whether the user 120 will arrive to the airport on time for a flight, the master language model agent 605 may retrieve context data from the context store 670 and retrievers indicating additional context (e.g., risk of missing flight) associated with the user prompt.

For instance, the master language model agent 605 may generate a modified or updated user prompt which indicates the concern of the user 120 in missing the upcoming flight. The modified or digitally generated user prompt may include additional or supplemental topics added to the initial user prompt to provide more context to the LLM in generating a response. For instance, an initial prompt which includes "provide directions to the airport" may be modified based on context data to include "provide directions to the airport because there is a chance of missing the upcoming flight." The modified or automated prompt may be input into an LLM to cause the LLM to generate a personalized or tailored response which answers the question of whether the user 120 will arrive at the airport on time to make an upcoming flight and addressed the concern of missing the flight.

Figure 7:
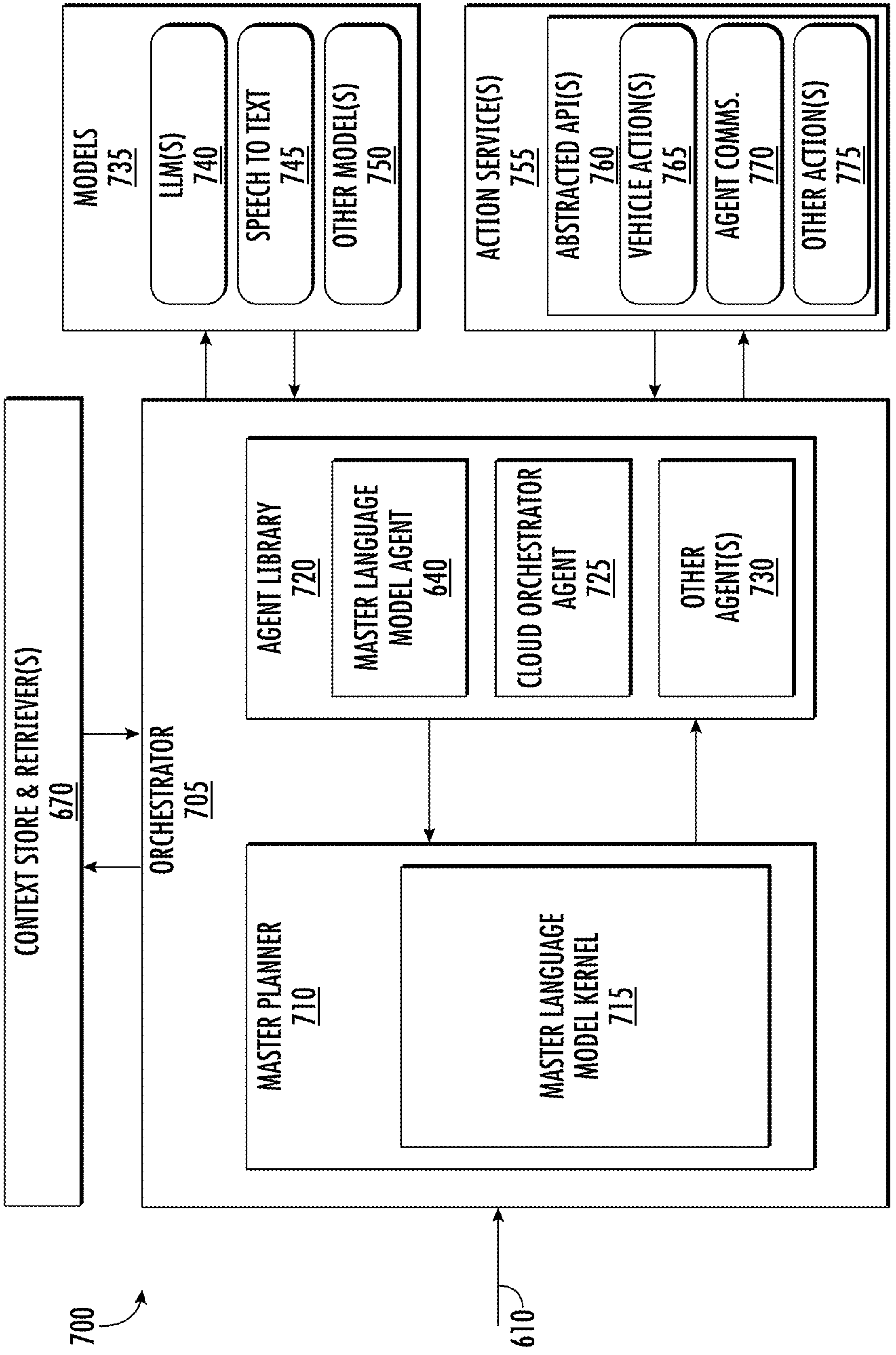
FIG. 7 illustrates an example dataflow pipeline according to an embodiment hereof.

FIG. 7 depicts an example dataflow pipeline according to an embodiment hereof. The following description of dataflow in data pipeline 700 is described with an example implementation in which an orchestrator 705 utilizes a master planner 710 and agent library 720 to process data from input sources 610 to plan and implement intermediate actions across the agent library 720 in response to the data from the input sources 610. The orchestrator 705 may utilize the master planner 710 to maintain concurrency across all agents within the agent library 720 as intermediate actions are planned and implemented using the action services 755.

The orchestrator 705 can include software running on one or more servers. For instance, the orchestrator 705 may include software running one or more servers of the vehicle computing system 200 (e.g., on-board the vehicle 105), the computing platform 110, third-party computing platform 125, the user device 115, etc. The orchestrator 705 may be configured to coordinate the processing of user prompts from input sources 610.

For instance, the orchestrator 705 may include a master planner 710. The master planner 710 may include software configured to plan tasks (e.g., actions, responses, etc.) determined by the master language model kernel 715. The master language model kernel 715 may include a computer program at the core of the operating system for the orchestrator 705. For instance, the master language model kernel 715 may control the master planner 710 and agents within the agent library 720. In an embodiment, the master language model kernel 715 may prevent or mitigate conflicts between processes implemented by the agents within the agent library 720, models 735, action services 755 etc.

For example, the master language model kernel 715 may control the master language model agent 605 to facilitate the processing of user prompts using the models 735 associated with agents within the agent library and the action services 755. The models 735 may include LLMs 740, speech-to-text models 745, or any other type of machine-learned model 750. The LLMs 740 may include machine-learned large language models trained to generate text in response to prompts such as questions, statements, etc.; the speech-to-text models 745 may include machine-learned models trained to detect words in audio files (e.g., voice prompts 615, etc.); and other machine-learned models may include any type of machine-learned models trained to process data and generate outputs.

The models 735 may be associated with the agents within the agent library 720. For instance, the agents within the agent library 720 and the models 735 may operate to resolve assigned tasks such as intermediate actions, etc. By way of example, the master language model agent 605 may be an agent of the LLM 740 where the LLM 740 is configured to generate text based on input such as user prompts, automated prompts, etc., while the master language model agent 605 is configured to break down complex tasks. For example, the master language model agent 605 may be configured to break down complex tasks such as determining an intent of a user prompt, determining intermediate actions to take to satisfy the intent, reasoning over the result, etc., into manageable subtasks and execute them independently. In an embodiment the master language model agent 605 may be configured to operate without continuous human input and utilize the LLMs 740, speech to text model, other models 750, etc., as a tool to facilitate operations.

In an embodiment, the cloud orchestrator agent 725 and/or other agents 730 may operate to resolve assigned tasks. For instance, the cloud orchestrator agent 725 and/or the other agents 730 may be an agent of the LLMs 740, speech-to-text models 745, etc., where the cloud orchestrator agent 725 and/or the other agents 730 communicate with LLMs 740, speech-to-text models 745, etc., that are deployed in a cloud environment. In an embodiment, models 735 deployed in a cloud environment may be used to process highly complex tasks (e.g., with bigger or more trained models). In contrast local models 735 such as models 735 deployed within the vehicle computing system 200 may be smaller or specialized models. While embodiments herein describe cloud models as being bigger or more trained and local models as being smaller or specialized, the present disclosure is not limited to such embodiment and the models 735 of varying size, level of training or specialization may be deployed across and of the computing systems described herein.

In an embodiment, the agents in the agent library 720 may be configured to directly to resolve assigned tasks by calling (e.g., API calls, etc.) the action services 755. The action services 755 may include the intermediate action tools 630 described in FIG. 6. For instance, the action services 755 may include a set of abstracted application programming interfaces (APIs) 760 which provide an interface for the orchestrator to interact with various systems. By way of example, the abstracted APIs 760 may include a vehicle API 765 for activating one or more vehicle functions of the vehicle 105, an agent communications API 770 for facilitating communications with agents across the agent library 720 or agents associated with remote computing systems, or other actions API 775 for facilitating a transfer or modification of data between computing systems.

For instance, the other actions API may enable the master language model agent 605 or other agents to query data across the internet, modify or create data in remote computing systems, access remote databases, etc., using APIs. One of ordinary skill in the art will appreciate that several other actions may be implemented using API calls within the abstracted APIs. In this manner, the action services 755 is separate from the processing and orchestration of resolving intermediate tasks associated with the user prompt decreasing the complexity of the orchestrator 705, master language model kernel 715, master language model agent 605, etc. This architecture may enable scalability in on-boarding new capabilities (e.g., models 735, action services 755, etc.) to resolve increasing complex tasks.

In an embodiment, the master language model kernel 715 and the master language model agent 605 may be implemented in a framework which facilitates the integration of the large language models (e.g., models 735) into applications that may be executed according to the an order defined by the orchestrator 705. An example framework may include a LangChain® framework which provides a declarative way to define a chain of actions (e.g., intermediate actions, responses, etc.). For instance, the master language model kernel 715 may cause the master language model agent 605 to break down and resolve complex tasks such as determining an intent of a user prompt, determining intermediate actions to take to satisfy the intent, reasoning over the result, etc. and directing the master language model agent 605 to utilize the models 735 and action services 755 to generate text based responses and implement the intermediate actions. In an embodiment, the master language model kernel 715 may cause the master language model agent 605 to assign tasks to the cloud orchestrator agent 725 or other agents 730 to resolve assigned tasks.

By way of example, a user prompt (e.g., provided via an input source 610) may be received by the master language model kernel 715. In response, the master language model kernel 715 may assign a task of resolving (e.g., satisfying) the user prompt to the master language model agent 605. For instance, the master language model agent 605 may break down an initial user prompt (e.g., provided via an input source 610) and determine an initial task (e.g., intermediate action. In an embodiment, the context store 670 and retrievers may provide environmental data and/or context data to the orchestrator 705. For instance, the master language model agent 605 may determine additional information (e.g., environmental data, context data, etc.) is needed to resolve the task. In an embodiment, the master language model agent 605 may be tasked with determining the intent of the user prompt to ensure the user prompt is resolved. The master language model agent 605 may access the context store 670 and retrievers and incorporate environmental data, context data etc. to determine an intent of the user prompt.

In an embodiment, the master language model agent 605 may implement intermediate actions by communicating with the master planner 710 to assign a targeted agent (e.g., within the agent library 720) for resolution or calling one or more action services 755 directly to resolve the task of implementing the intermediate action. By way of example, for an intermediate action assigned to the master language model kernel 715, the master language model kernel 715 may make a decision to assign agents within the agent library 720 to resolve that tasks. For instance, an intermediate action may be complex and require more processing to be resolved. As such the master language model kernel 715 may utilize the master planner to assign the task to the cloud orchestrator agent 725, other agents 730 etc. The cloud orchestrator agent 725 and the other agents 730 may be associated with a larger highly trained model 735 deployed to the cloud and utilize the model to resolve the complex task.

In an embodiment, agents within the agent library 720 may interact with the models 735 or action services and retrieve external data or information from across the internet and provide the external data back to the master language model kernel 715. For instance, a result of an intermediate action may be obtaining external data which may be used in reasoning over whether the intermediate action satisfies the user prompt.

By way of example, the master language model agent 605 may utilize the other actions API 775 to retrieve weather and traffic information from remote computing systems. Based on the weather/traffic forecast and reasoning over the resulting data, additional intermediate actions may be needed to resolve the user prompt. For instance, a user prompt may include a request to "make the car comfortable". Based on the weather/traffic forecast data retrieved from the remote computing systems, the master language model agent 605 may determine vehicle actions are needed to adjust the climate, seat position, massage feature, etc. within the vehicle 105 to the conditions of the upcoming drive. For instance, the master planner 710 may assign tasks (e.g., intermediate actions) associated with the vehicle actions to agents within the agent library or utilized the action services 755 to resolve the intermediate actions.

In an embodiment, the orchestrator 705 may iteratively coordinate intermediate actions to satisfy the user prompt and generate a final response to return to the user 120. For instance, the orchestrator 705 may perform intermediate actions such as retrieving data, modifying data, and generating natural language response prior to performing any actions within the vehicle 105. By way of example, the orchestrator may plan the chain of intermediate actions such that all external data needed to satisfy the user prompt is retrieved and processed and a final response to the user is generated (e.g., by an LLM 740, etc.) prior to implementing actions within the vehicle 105. In this manner, the entire chain of intermediate actions may be combined to form the final response and implemented sequentially or concurrently within the vehicle 105 along with an audio response to the user 120.

While examples herein describe the role of master language model agent as being limited by the orchestration (e.g., planning, etc.) of the master language model kernel 715, the present disclosure is not limited to such embodiment and the master language model agent 605 may be responsible for orchestrating tasks and may have absolute authority over the results that should be included in a final response. In this manner, master language model agent's role may be a floating role which can exist across any of the computing systems described herein.

Figure 8:
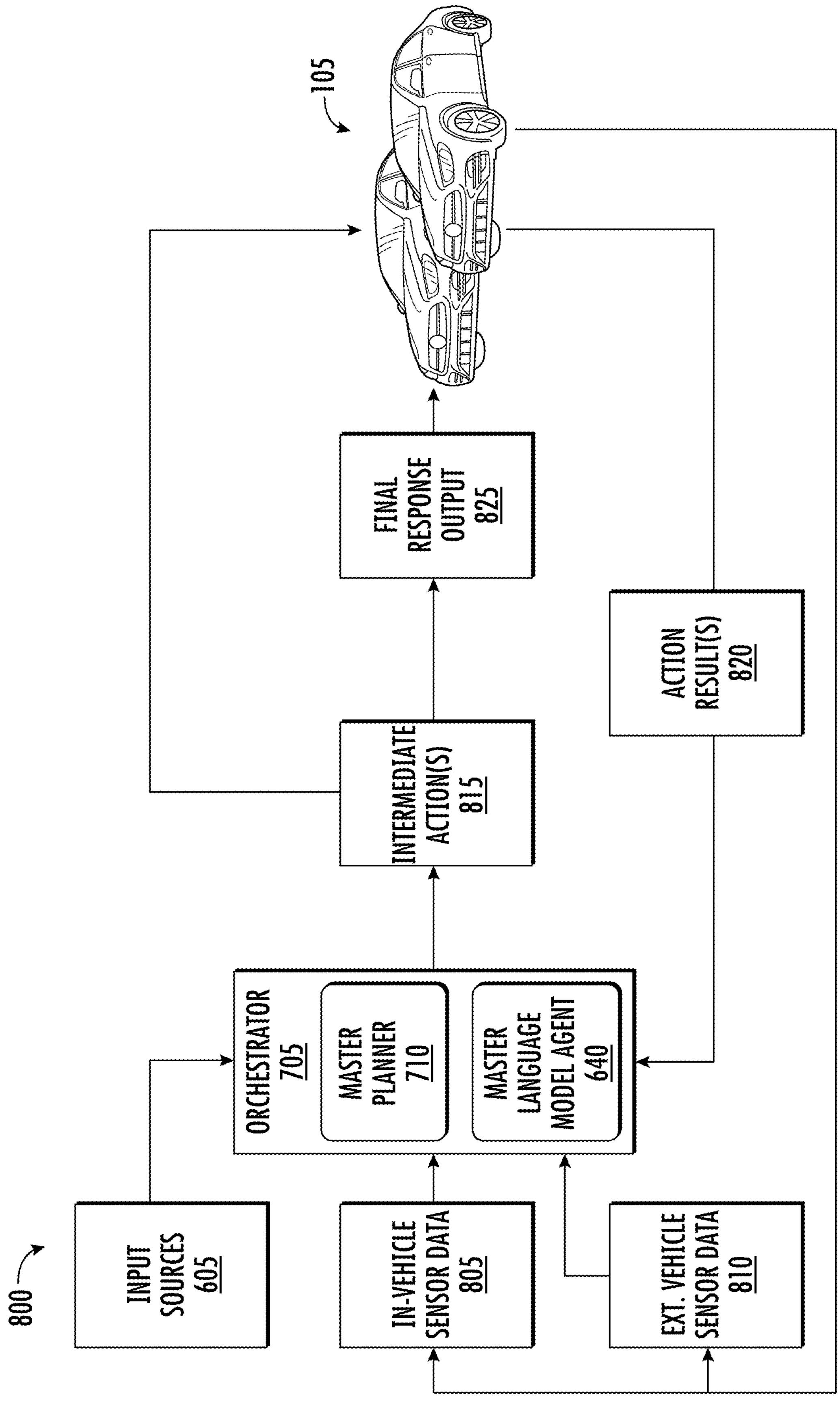
FIG. 8 illustrates an example dataflow pipeline according to an embodiment hereof.

FIG. 8 depicts an example dataflow pipeline according to an embodiment hereof. The following description of dataflow in dataflow pipeline 800 is described with an example implementation in which intermediate actions 815 and a final response output 825 are determined based on in-vehicle sensor data 805 and exterior vehicle sensor data 810. The intermediate actions 815 and a final response output 825 are implemented in a vehicle 105 in response to data from one or more input sources 610.

In the example dataflow pipeline 800, a vehicle occupant may provide a user prompt through one or more input sources 610. For instance, the input source 610 may include a voice prompt 615 to a voice assistant running on the vehicle computing system 200. By way of example, the vehicle occupant may provide a voice command requesting to turn on a seat massage. The in-vehicle sensor data 805 may include sensor data 310 captured in response to, or concurrently, with the voice prompt 615. For instance, the in-vehicle sensor data 805 may include sensor data 310 captured at a threshold timestamp associated with the voice prompt 615. A threshold time may include three seconds, five seconds, etc. before or after the user prompt was received. In an embodiment, in-vehicle sensor data 805 may be stored as vehicle data 335 and stored within one or more data sources 645 to be processed by the context engine. For instance, the in-vehicle sensor data 805 may be environmental data used by the master language model agent 605 within the orchestrator 705 to determine an intermediate action 815 or chain of intermediate actions 815 which satisfies the voice prompt 615.

In an embodiment, the exterior vehicle sensor data 810 may be captured in response to, or concurrently, with the voice prompt 615. For instance, the exterior vehicle sensor data 810 may include also sensor data 310 captured at a threshold timestamp associated with the voice prompt 615. Similar to the in-vehicle sensor data, the exterior vehicle sensor data 810 may be environmental data used by the master language model agent 605 within the orchestrator 705 to determine an intermediate action 815 which satisfies the voice prompt 615.

For example, the master language model agent 605 may determine a first intent based on the in-vehicle sensor data 805 (e.g., environmental data) that the user 120 should receive a back and neck massage. For instance, the in-vehicle sensor data 805 may include sensor data indicating the user 120 has poor sitting posture and determine an intermediate action 815 of activating the back and neck massage seat function to satisfy the intent of the voice prompt 615 to relieve discomfort from poor posture. In another example, the master language model agent 605 may determine another intermediate action 815, based on the exterior vehicle sensor data 810 indicating that the outside temperature of the vehicle 105 is cold. For instance, the other intermediate action may include activating a seat warming function to make the massage more enjoyable to the user 120.

The orchestrator 705 and master planner 710 may plan and implement the intermediate actions 815 using other agents (e.g., within the agent library 720, action services 755, etc.) iteratively or concurrently. For instance, the intermediate actions 815 may be directly implemented within the vehicle 105 and an action result 820 may be provided back to the master language model agent 605. The action result 820 may provide context on whether the voice prompt 615 has been satisfied. For example, the master language model agent 605 may reason over the action result 820 to determine whether additional actions are needed to resolve the voice prompt 615. For instance, once implemented, the user 120 may still show signs of discomfort indicating the voice prompt 615 has not been satisfied. In this manner, the master language model agent may iteratively determine intermediate actions 815, implement the intermediate actions 815, and reason over the action result 820 until the voice prompt 615 has been satisfied.

In another embodiment, the orchestrator 705 and master planner 710 may coordinate a chain of intermediate actions 815 and generate a final response output 825 which include the chain of intermediate actions 815 and an audio or visual response for the user 120. By way of example, the master language model agent 605 may determine a second intent of the voice prompt 615, based on the in-vehicle sensor data 805 (e.g., indicating poor posture) is to address discomfort resulting from poor posture. In response, the master language model agent 605 may determine an intermediate action (e.g., utilizing models 735, action services 755, etc.) to retrieve helpful information from the Internet for addressing discomfort from poor posture. In an embodiment, the master planner 710 may determine an order of intermediate actions 815 where the intermediate action 815 to search the internet for helpful information is first in a chain of intermediate actions 815 followed by activating the neck and back massage function and activating the seat heating function. Moreover, another intermediate action 815 of presenting the internet search findings to the user 120 may be determined and included in the chain of intermediate actions 815. The chain of intermediate actions 815 may be included in the final response output 825 and implemented within the vehicle 105. For instance, the interior vehicle sensors such as the speakers may be used by the in-vehicle voice assistant to provide the internet findings and the vehicle functions activating the seat massage and seat heating may be activated In an embodiment, the action result 820 from the final response output 825 may be received by the master language model agent 605. For instance, the master language model agent 605 may reason over the action result 820 or utilize the action result 820 for further training.

Figure 9:
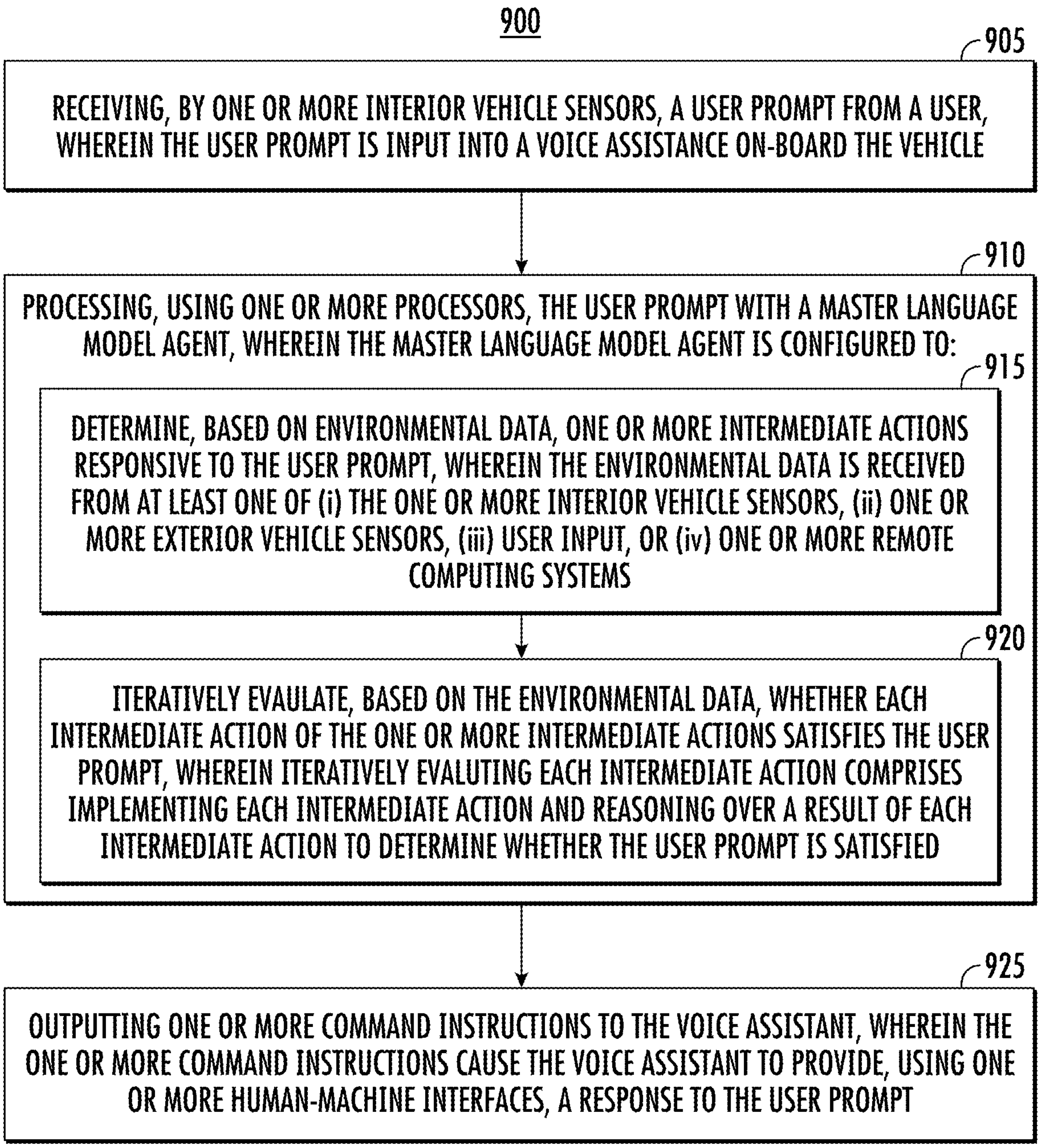
FIG. 9 illustrates a flowchart diagram of an example method according to an embodiment hereof.

FIG. 9 illustrates a flowchart diagram of an example method 900 for personalizing a user experience according to an embodiment hereof. The method 900 may be performed by a computing system described with reference to the other figures. In an embodiment, the method 900 may be performed by the control circuit of a vehicle computing system 200 of FIG. 1. One or more portions of the method 900 may be implemented as an algorithm on the hardware components of the devices described herein. For example, the steps of method 900 may be implemented as operations/instructions that are executable by computing hardware.

FIG. 9 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 9 is described with reference to elements/terms described with respect to other systems and figures, for example illustrated purposes and is not meant to be limiting. One or more portions of method 900 may be performed additionally, or alternatively, by other systems. For example, method 900 may be performed by a control circuit of the computing platform 110.

In an embodiment, the method 900 may begin with or otherwise include an operation 905: receiving, by one or more interior vehicle sensors, a user prompt from a user, wherein the user prompt is input into a voice assistant on-board the vehicle. For instance, the user 120 may provide a voice command that is received by a microphone or other interior sensor within the vehicle 105 to a voice assistant available via the vehicle computing system 200.

The method 900 in an embodiment may include an operation 910: processing, using one or more processors, the user prompt with a master language model agent. For instance, the voice assistant may provide the user prompt to the master language model agent 604 for processing to determine, in response to the user prompt, one or more intermediate actions 815.

The method 900 in an embodiment may include an operation 915: wherein the master language model agent 604 is configured to determine, based on environmental data, one or more intermediate actions 815 responsive to the user prompt, wherein the environmental data is received from at least one of (i) the one or more interior vehicle sensors, (ii) one or more exterior vehicle sensors, (iii) user input, or (iv) one or more remote computing systems.

For instance, the master language model agent 605 may determine based on in-vehicle sensor data 805 and exterior vehicle sensor data 810 additional information associated with the user prompt. By way of example, in-vehicle sensor data 805 may indicate the user 120 is tired from a long workday and exterior vehicle sensor data 810 may indicate the user 120 is sitting in traffic. Based on a user prompt to "play music", the master language model agent 605 may determine a first intent of the user 120 is to uplift a mood or a sentiment during the drive. For example, the master language model agent 605 may determine a first intermediate action 815 of playing uplifting music. In an embodiment, the master language model agent 605 may determine a second intent of determining a faster or less congested route to a destination. For example, the master language model agent 605 may determine a second intermediation action 815 of searching (e.g., a remote computing system) for a scenic or more efficient route.

The method 900 in an embodiment may include an operation 920: wherein the master language model agent is configured to iteratively evaluate, based on the environmental data, whether each intermediate action of the one or more intermediate actions satisfies the user prompt, wherein iteratively evaluating each intermediate action comprises implementing each intermediate action and reasoning over a result of each intermediate action to determine whether the user prompt is satisfied. For instance, the agents within an agent library 720 or the master language model agent 605 may sequentially or concurrently execute the first and second intermediate actions by utilizing the models 735, action services 755, etc.

By way of example, other models 750 may include an LLM configured to process voice prompts 615 and return a result such as playlists or songs for various genres of music. The first intermediate action 815 may be implemented by providing, via speakers within the vehicle 105, an uplifting music playlist to the user 120. The master language model agent 605 may reason over the action result 820 of the first intermediate action 815. In an embodiment, the master language model agent 605 may iteratively reason over the a plurality of action results of 820 of the intermediate actions 815 until the user prompt has been satisfied.

The method 900 in an embodiment may include an operation 925: outputting one or more command instructions to the voice assistant, wherein the one or more command instructions cause the voice assistant to provide, using one or more human-machine interfaces, a response to the user prompt. For instance, based on in-vehicle sensor data 805 (e.g., environmental data) indicating a sentiment of the user 120 is unchanged, the mater language model agent may implement the second intermediate action to suggest a more scenic route to the user 120. By way of example, the voice assistant within the vehicle 105 may prompt the user 120 using one or more speakers within the vehicle with an option to change the current route of the vehicle 105 to the scenic route. In an embodiment, the voice assistant may also provide a response to the user indicating receipt of the user prompt and an explanation indicating the intermediate actions which have been implemented in response to the user prompt.

Figure 10:
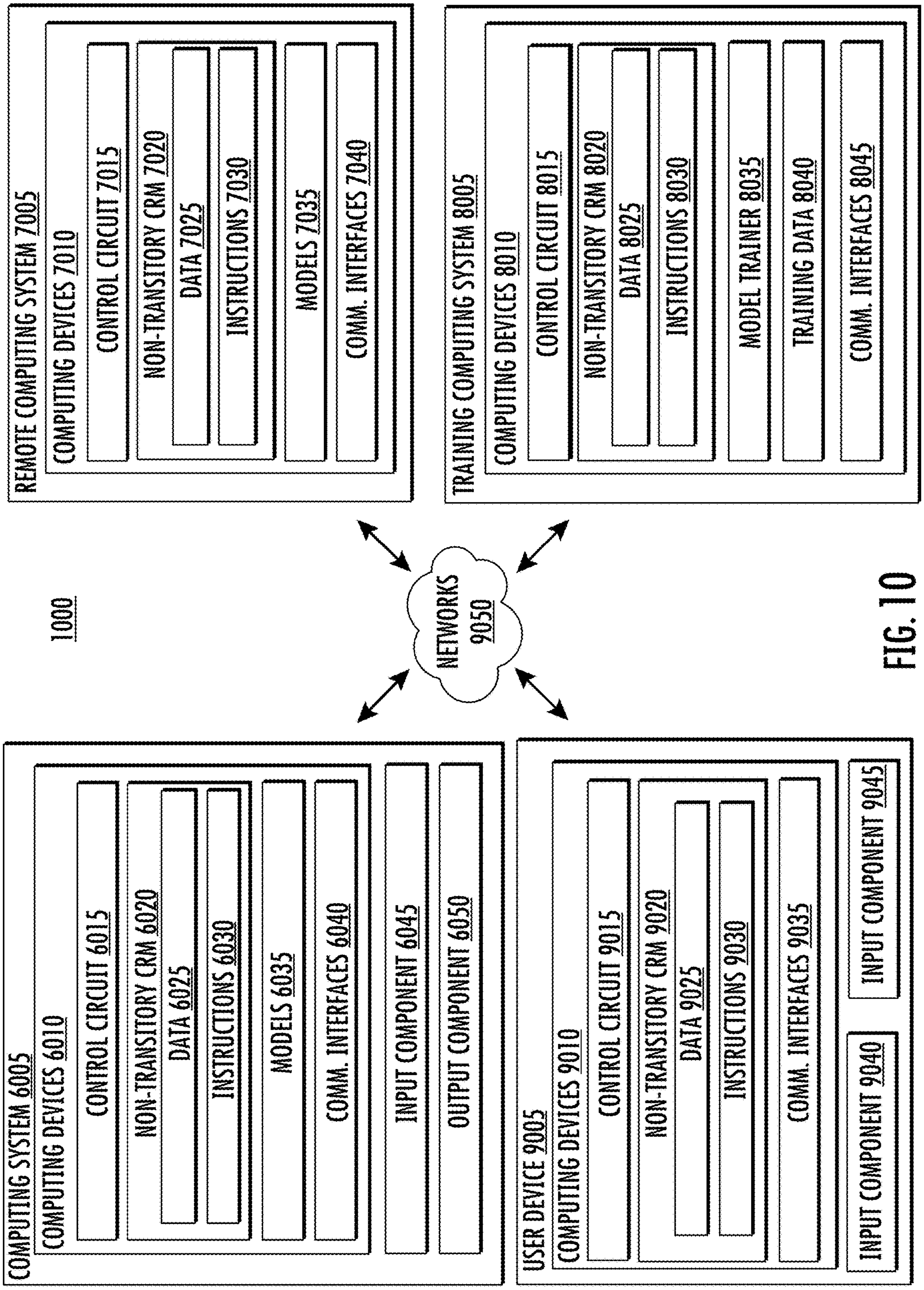
FIG. 10 illustrates a diagram of an example computing ecosystem with computing components according to an embodiment hereof.

FIG. 10 illustrates a block diagram of an example computing system 1000 according to an embodiment hereof. The system 1000 includes a computing system 6005 (e.g., a computing system onboard a vehicle), a remote computing system 7005 (e.g., computing platform 110), a user device 9005 (e.g., user device 115), and a training computing system 8005 that are communicatively coupled over one or more networks 9050.

The computing system 6005 may include one or more computing devices 6010 or circuitry. For instance, the computing system 6005 may include a control circuit 6015 and a non-transitory computer-readable medium 6020, also referred to herein as memory. In an embodiment, the control circuit 6015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 6015 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 6015 may be programmed by one or more computer-readable or computer-executable instructions stored on the non-transitory computer-readable medium 6020.

In an embodiment, the non-transitory computer-readable medium 6020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 6020 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 6020 may store information that may be accessed by the control circuit 6015. For instance, the non-transitory computer-readable medium 6020 (e.g., memory devices) may store data 6025 that may be obtained, received, accessed, written, manipulated, created, and/or stored. The data 6025 may include, for instance, any of the data or information described herein. In some implementations, the computing system 6005 may obtain data from one or more memories that are remote from the computing system 6005.

The non-transitory computer-readable medium 6020 may also store computer-readable instructions 6030 that may be executed by the control circuit 6015. The instructions 6030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 6015 to perform one or more functional tasks. The modules and computer-readable/executable instructions may be described as performing various operations or tasks when the control circuit 6015 or other hardware component is executing the modules or computer-readable instructions.

The instructions 6030 may be executed in logically and/or virtually separate threads on the control circuit 6015. For example, the non-transitory computer-readable medium 6020 may store instructions 6030 that when executed by the control circuit 6015 cause the control circuit 6015 to perform any of the operations, methods and/or processes described herein. In some cases, the non-transitory computer-readable medium 6020 may store computer-executable instructions or computer-readable instructions, such as instructions to perform at least a portion of the method of FIG. 9.

In an embodiment, the computing system 6005 may store or include one or more machine-learned models 6035. For example, the machine-learned models 6035 may be or may otherwise include various machine-learned models, including any of the machine-learned models described herein. In an embodiment, the machine-learned models 6035 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models). As another example, the machine-learned models 6035 can include generative models, such as stable diffusion models, generative adversarial networks (GAN), GPT models, and other suitable models.

In an aspect of the present disclosure, the models 6035 may be used to collect and translate environmental or contextual information associated with commands received from a user (e.g., user 120) to personalize actions taken within the vehicle (e.g., vehicle 105). For example, the machine-learned models 6035 can, in response to a voice prompt 615 determine and implement actions and responses and reason over whether the actions or response satisfy the intent of the voice prompt 615. The models 6035 may utilize the environment and context data to generate actions and reason over the personalized output responses.

In an embodiment, the one or more machine-learned models 6035 may be received from the remote computing system 7005 over networks 9050, stored in the computing system 6005 (e.g., non-transitory computer-readable medium 6020), and then used or otherwise implemented by the control circuit 6015. In an embodiment, the computing system 6005 may implement multiple parallel instances of a single model.

Additionally, or alternatively, one or more machine-learned models 6035 may be included in or otherwise stored and implemented by the remote computing system 7005 that communicates with the computing system 6005 according to a client-server relationship. For example, the machine-learned models 6035 may be implemented by the remote computing system 7005 as a portion of a web service. Thus, one or more models 6035 may be stored and/or implemented (e.g., as models 7035) within the computing system 6005 and/or one or more models 6035 may be stored and implemented within the remote computing system 7005.

The computing system 6005 may include one or more communication interfaces 6040. The communication interfaces 6040 may be used to communicate with one or more other systems. The communication interfaces 6040 may include any circuits, components, software, etc. for communicating via one or more networks (e.g., networks 9050). In some implementations, the communication interfaces 6040 may include for example, one or more of a communications controller, receiver, transceiver, transmitter, port, conductors, software and/or hardware for communicating data/information.

The computing system 6005 may also include one or more user input components 6045 that receives user input. For example, the user input component 6045 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 6005 may include one or more output components 6050. The output components 6050 may include hardware and/or software for audibly or visually producing content. For instance, the output components 6050 may include one or more speakers, earpieces, headsets, handsets, etc. The output components 6050 may include a display device, which may include hardware for displaying a user interface and/or messages for a user. By way of example, the output component 6050 may include a display screen, CRT, LCD, plasma screen, touch screen, TV, projector, tablet, and/or other suitable display components.

The remote computing system 7005 may include one or more computing devices 7010. In an embodiment, the remote computing system 7005 may include or is otherwise implemented by one or more computing devices onboard an autonomous drone. In instances in which the remote computing system 7005 includes computing devices within cloud infrastructure, such computing devices may operate according to sequential computing architectures, parallel computing architectures, or some combination thereof.

The remote computing system 7005 may include a control circuit 7015 and a non-transitory computer-readable medium 7020, also referred to herein as memory 7020. In an embodiment, the control circuit 7015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 7015 may be programmed by one or more computer-readable or computer-executable instructions stored on the non-transitory computer-readable medium 7020.

In an embodiment, the non-transitory computer-readable medium 7020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 7020 may store information that may be accessed by the control circuit 7015. For instance, the non-transitory computer-readable medium 7020 (e.g., memory devices) may store data 7025 that may be obtained, received, accessed, written, manipulated, created, and/or stored. The data 7025 may include, for instance, any of the data or information described herein. In some implementations, the server system 7005 may obtain data from one or more memories that are remote from the server system 7005.

The non-transitory computer-readable medium 7020 may also store computer-readable instructions 7030 that may be executed by the control circuit 7015. The instructions 7030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 7015 to perform one or more functional tasks. The modules and computer-readable/executable instructions may be described as performing various operations or tasks when the control circuit 7015 or other hardware component is executing the modules or computer-readable instructions.

The instructions 7030 may be executed in logically and/or virtually separate threads on the control circuit 7015. For example, the non-transitory computer-readable medium 7020 may store instructions 7030 that when executed by the control circuit 7015 cause the control circuit 7015 to perform any of the operations, methods and/or processes described herein. In some cases, the non-transitory computer-readable medium 7020 may store computer-executable instructions or computer-readable instructions, such as instructions to perform at least a portion of the method of FIG. 9.

The remote computing system 7005 may include one or more communication interfaces 7040. The communication interfaces 7040 may be used to communicate with one or more other systems. The communication interfaces 7040 may include any circuits, components, software, etc. for communicating via one or more networks (e.g., networks 7050). In some implementations, the communication interfaces 7040 may include for example, one or more of a communications controller, receiver, transceiver, transmitter, port, conductors, software and/or hardware for communicating data/information.

The computing system 6005 and/or the remote computing system 7005 may train the models 6035, 7035 via interaction with the training computing system 8005 that is communicatively coupled over the networks 9050. The training computing system 8005 may be separate from the remote computing system 7005 or may be a portion of the remote computing system 7005.

The training computing system 8005 may include one or more computing devices 8010. In an embodiment, the training computing system 8005 may include or is otherwise implemented by one or more server computing devices. In instances in which the training computing system 8005 includes plural server computing devices, such server computing devices may operate according to sequential computing architectures, parallel computing architectures, or some combination thereof.

The training computing system 8005 may include a control circuit 8015 and a non-transitory computer-readable medium 8020, also referred to herein as memory 8020. In an embodiment, the control circuit 8015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 8015 may be programmed by one or more computer-readable or computer-executable instructions stored on the non-transitory computer-readable medium 8020.

In an embodiment, the non-transitory computer-readable medium 8020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 8020 may store information that may be accessed by the control circuit 8015. For instance, the non-transitory computer-readable medium 8020 (e.g., memory devices) may store data 8025 that may be obtained, received, accessed, written, manipulated, created, and/or stored. The data 8025 may include, for instance, any of the data or information described herein. In some implementations, the training computing system 8005 may obtain data from one or more memories that are remote from the training computing system 8005.

The non-transitory computer-readable medium 8020 may also store computer-readable instructions 8030 that may be executed by the control circuit 8015. The instructions 8030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 8015 to perform one or more functional tasks. The modules and computer-readable/executable instructions may be described as performing various operations or tasks when the control circuit 8015 or other hardware component is executing the modules or computer-readable instructions.

The instructions 8030 may be executed in logically or virtually separate threads on the control circuit 8015. For example, the non-transitory computer-readable medium 8020 may store instructions 8030 that when executed by the control circuit 8015 cause the control circuit 8015 to perform any of the operations, methods and/or processes described herein. In some cases, the non-transitory computer-readable medium 8020 may store computer-executable instructions or computer-readable instructions, such as instructions to perform at least a portion of the methods of FIG. 9.

The training computing system 8005 may include a model trainer 8035 that trains the machine-learned models 6035, 7035 stored at the computing system 6005 and/or the remote computing system 7005 using various training or learning techniques. For example, the models 6035, 7035 may be trained using a loss function that evaluates the quality of generated samples over various characteristics, such as similarity to the training data.

The training computing system 8005 may modify parameters of the models 6035, 7035 based on the loss function (e.g., generative loss function) such that the models 6035, 7035 may be effectively trained for specific applications in a supervised manner using labeled data and/or in an unsupervised manner.

In an example, the model trainer 8035 may backpropagate the loss function through the user intent model 1002 to modify the parameters (e.g., weights) of the generative model (e.g., 620). The model trainer 8035 may continue to backpropagate the clustering loss function through the machine-learned model, with or without modification of the parameters (e.g., weights) of the model. For instance, the model trainer 8035 may perform a gradient descent technique in which parameters of the machine-learned model may be modified in a direction of a negative gradient of the clustering loss function. Thus, in an embodiment, the model trainer 8035 may modify parameters of the machine-learned model based on the loss function.

The model trainer 8035 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In an embodiment, performing backwards propagation of errors may include performing truncated backpropagation through time. The model trainer 8035 may perform a number of generalization techniques (e.g., weight decays, dropouts, etc.) to improve the generalization capability of a model being trained. In particular, the model trainer 8035 may train the machine-learned models 6035, 7035 based on a set of training data 8040.

The training data 8040 may include unlabeled training data for training in an unsupervised fashion. Furthermore, in some implementations, the training data 8040 can include labeled training data for training in a supervised fashion. For example, the training data 8040 can be or can include the data from the input sources 610 or data sources 645 of FIG. 6.

In an embodiment, if the user has provided consent/authorization, training examples may be provided by the computing system 6005 (e.g., of the user's vehicle). Thus, in such implementations, a model 6035 provided to the computing system 6005 may be trained by the training computing system 8005 in a manner to personalize the model 6035.

The model trainer 8035 may include computer logic utilized to provide desired functionality. The model trainer 8035 may be implemented in hardware, firmware, and/or software controlling a general-purpose processor. For example, in an embodiment, the model trainer 8035 may include program files stored on a storage device, loaded into a memory and executed by one or more processors. In other implementations, the model trainer 8035 may include one or more sets of computer-executable instructions that are stored in a tangible computer-readable storage medium such as RAM, hard disk, or optical or magnetic media.

The training computing system 8005 may include one or more communication interfaces 8045. The communication interfaces 8045 may be used to communicate with one or more other systems. The communication interfaces 8045 may include any circuits, components, software, etc. for communicating via one or more networks (e.g., networks 9050). In some implementations, the communication interfaces 8045 may include for example, one or more of a communications controller, receiver, transceiver, transmitter, port, conductors, software and/or hardware for communicating data/information.

The computing system 6005, the remote computing system 7005, and/or the training computing system 8005 may also be in communication with a user device 9005 that is communicatively coupled over the networks 9050.

The user device 9005 may include various types of user devices. This may include head-worn wearable devices (e.g., AR glasses, watches, etc.), handheld devices, tablets, or other types of devices.

The user device 9005 may include one or more computing devices 9010. The user device 9005 may include a control circuit 9015 and a non-transitory computer-readable medium 9020, also referred to herein as memory 9020. In an embodiment, the control circuit 9015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 9015 may be programmed by one or more computer-readable or computer-executable instructions stored on the non-transitory computer-readable medium 9020.

In an embodiment, the non-transitory computer-readable medium 9020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 9020 may store information that may be accessed by the control circuit 9015. For instance, the non-transitory computer-readable medium 9020 (e.g., memory devices) may store data 9025 that may be obtained, received, accessed, written, manipulated, created, and/or stored. The data 9025 may include, for instance, any of the data or information described herein. In some implementations, the user device 9005 may obtain data from one or more memories that are remote from the user device 9005.

The non-transitory computer-readable medium 9020 may also store computer-readable instructions 9030 that may be executed by the control circuit 9015. The instructions 9030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 9015 to perform one or more functional tasks. The modules and computer-readable/executable instructions may be described as performing various operations or tasks when the control circuit 9015 or other hardware component is executing the modules or computer-readable instructions.

The instructions 9030 may be executed in logically or virtually separate threads on the control circuit 9015. For example, the non-transitory computer-readable medium 9020 may store instructions 9030 that when executed by the control circuit 9015 cause the control circuit 9015 to perform any of the operations, methods and/or processes described herein. In some cases, the non-transitory computer-readable medium 9020 may store computer-executable instructions or computer-readable instructions, such as instructions to perform at least a portion of the method of FIG. 9.

The user device 9005 may include one or more communication interfaces 9035. The communication interfaces 9035 may be used to communicate with one or more other systems. The communication interfaces 9035 may include any circuits, components, software, etc. for communicating via one or more networks (e.g., networks 7050). In some implementations, the communication interfaces 9035 may include for example, one or more of a communications controller, receiver, transceiver, transmitter, port, conductors, software and/or hardware for communicating data/information.

The user device 9005 may also include one or more user input components 9040 that receives user input. For example, the user input component 9040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input. In an embodiment, the input components 9040 may include audio and virtual components such as a microphone (e.g., voice commands), accelerometers/gyroscopes (e.g., physical commands), etc.

The user device 9005 may include one or more output components 9045. The output components 9045 may include hardware and/or software for audibly or visually producing content. For instance, the output components 9045 may include one or more speakers, earpieces, headsets, handsets, etc. The output components 9045 may include a display device, which may include hardware for displaying a user interface and/or messages for a user. By way of example, the output component 9045 may include a display screen, CRT, LCD, plasma screen, touch screen, TV, projector, tablet, and/or other suitable display components.

The one or more networks 9050 may be any type of communications network, such as a local area network (e.g., intranet), wide area network (e.g., Internet), or some combination thereof and may include any number of wired or wireless links. In general, communication over a network 9050 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Additional Discussion of Various Embodiments

Embodiment 1 relates to a computing system of a vehicle. The computing system may include a control circuit. The control circuit may be configured to receive, by one or more interior vehicle sensors, a user prompt from a user, wherein the user prompt is input into a voice assistant on-board the vehicle. The control circuit may be configured to process, using one or more processors, the user prompt with a master language model agent. The master language model agent may be configured to determine, based on environmental data, one or more intermediate actions responsive to the user prompt, wherein the environmental data is received from at least one of (i) the one or more interior vehicle sensors, (ii) one or more exterior vehicle sensors, (iii) user input, or (iv) one or more remote computing systems. The master language model agent may be configured to iteratively evaluate, based on the environmental data, whether each intermediate action of the one or more intermediate actions satisfies the user prompt, wherein iteratively evaluating each intermediate action includes implementing each intermediate action and reasoning over a result of each intermediate action to determine whether the user prompt is satisfied. The control circuit may be configured to output one or more command instructions to the voice assistant, wherein the one or more command instructions cause the voice assistant to provide, using one or more human-machine interfaces, a response to the user prompt.

Embodiment 2 includes the computing system of embodiment 1. In this embodiment, the master language model agent may be configured to determine, based on the one or more intermediate actions, one or more vehicle actions responsive to the user prompt. The master language model agent may be configured to output the one or more command instructions to activate a vehicle function corresponding to the one or more vehicle actions.

Embodiment 3 includes the computing system of embodiment 2. In this embodiment, vehicle function may include at least one of (i) emitting an audio response, (ii) updating a user interface within the vehicle, (iii) adjusting a temperature setting within the vehicle, (iv) providing an entertainment suggestion, (v) providing a destination suggestion, or (vi) adjusting a comfort setting with the vehicle.

Embodiment 4 includes the computing system of any of the embodiments 1 to 3. In this embodiment, the environmental data may include data captured by one or more interior vehicle sensors or exterior vehicle sensors.

Embodiment 5 includes the computing system of any of the embodiments 1 to 4. In this embodiment, the master language model agent may be configured to generate, based on the environmental data, context data associated with a user profile of the user, wherein the context data includes additional information associated with the user prompt.

Embodiment 6 includes the computing system of embodiment 5. In this embodiment, the one or more intermediate actions are determined based on the context data and wherein the one or more intermediate actions satisfies the user prompt based on context data.

Embodiment 7 includes the computing system of any of the embodiments 1 to 6. In this embodiment, the one or intermediate actions includes communicating with another language model agent, the other language model agent associated with at least one of: (i) a specialized machine-learned model or (ii) a dataset remote from the master language model agent.

Embodiment 8 includes the computing system of any of the embodiments 1 to 7. In this embodiment, the master language model agent may be configured to determine, based on the environmental data, an intent of the user, the intent associated with the one or more intermediate actions. In this embodiment, the master language model agent may be configured to determine the one or more intermediate actions based on the intent of the user.

Embodiment 9 includes the computing system of any of the embodiments 1 to 8. In this embodiment, the master language model agent may be configured to orchestrate communications and actions across a plurality of language model agents to implement the one or more intermediate actions.

Embodiment 10 includes the computing system of any of the embodiments 1 to 9. In this embodiment, the one or more intermediate actions that satisfies the user prompt is indicative of an implicit action associated with the user prompt.

Embodiment 11 relates to a computer-implemented method. The method can include receiving, by one or more interior vehicle sensors, a user prompt from a user, wherein the user prompt is input into a voice assistant on-board the vehicle. The method can include processing, using one or more processors, the user prompt with a master language model agent. The master language model agent may be configured to determine, based on environmental data, one or more intermediate actions responsive to the user prompt, wherein the environmental data is received from at least one of (i) the one or more interior vehicle sensors, (ii) one or more exterior vehicle sensors, (iii) user input, or (iv) one or more remote computing systems. The master language model agent may be configured to iteratively evaluate, based on the environmental data, whether each intermediate action of the one or more intermediate actions satisfies the user prompt, wherein iteratively evaluating each intermediate action includes implementing each intermediate action and reasoning over a result of each intermediate action to determine whether the user prompt is satisfied. The method can include outputting one or more command instructions to the voice assistant, wherein the one or more command instructions cause the voice assistant to provide, using one or more human-machine interfaces, a response to the user prompt.

Embodiment 12 includes the computer-implemented method of embodiment 11. In this embodiment, the master language model agent may be configured to determine, based on the one or more intermediate actions, one or more vehicle actions responsive to the user prompt. In this embodiment, the master language model agent may be configured to output the one or more command instructions to activate a vehicle function corresponding to the one or more vehicle actions.

Embodiment 13 includes the computer-implemented method of embodiment 12. In this embodiment the vehicle function may include at least one of (i) emitting an audio response, (ii) updating a user interface within the vehicle, (iii) adjusting a temperature setting within the vehicle, (iv) providing an entertainment suggestion, (v) providing a destination suggestion, or (vi) adjusting a comfort setting with the vehicle.

Embodiment 14 includes the computer-implemented method of any of the embodiments 11 to 13. In this embodiment, the environmental data may include data captured by one or more interior vehicle sensors or exterior vehicle sensors.

Embodiment 15 includes the computer-implemented method of any of the embodiments 11 to 14. In this embodiment, the master language model agent may be configured to generate, based on the environmental data, context data associated with a user profile of the user, wherein the context data includes additional information associated with the user prompt.

Embodiment 16 includes the computer-implemented method of embodiment 15. In this embodiment, the one or more intermediate actions are determined based on the context data and wherein the one or more intermediate actions satisfies the user prompt based on context data.

Embodiment 17 includes the computer-implemented method of any of the embodiments 11 to 16. In this embodiment, the one or intermediate actions may include communicating with another language model agent, the other language model agent associated with at least one of: (i) a specialized machine-learned model or (ii) a dataset remote from the master language model agent.

Embodiment 18 includes the computer-implemented method of any of the embodiments 11 to 17. In this embodiment, the master language model agent may be configured to determine, based on the environmental data, an intent of the user, the intent associated with the one or more intermediate actions. In this embodiment, the master language model agent may be configured to determine the one or more intermediate actions based on the intent of the user.

Embodiment 19 includes the computer-implemented method of any of the embodiments 11 to 18. In this embodiment, the master language model agent may be configured to orchestrate communications and actions across a plurality of language model agents to implement the one or more intermediate actions.

Embodiment 20 is directed to one or more non-transitory computer-readable media. The one or more non-transitory computer readable media can store instructions that are executable by a control circuit. The control circuit executing the instructions can receive, by one or more interior vehicle sensors, a user prompt from a user, wherein the user prompt is input into a voice assistant on-board the vehicle. The control circuit executing the instructions can process, using one or more processors, the user prompt with a master language model agent, wherein the master language model agent is configured to determine, based on environmental data, one or more intermediate actions responsive to the user prompt, wherein the environmental data is received from at least one of (i) the one or more interior vehicle sensors, (ii) one or more exterior vehicle sensors, (iii) user input, or (iv) one or more remote computing systems and iteratively evaluate, based on the environmental data, whether each intermediate action of the one or more intermediate actions satisfies the user prompt, wherein iteratively evaluating each intermediate action includes implementing each intermediate action and reasoning over a result of each intermediate action to determine whether the user prompt is satisfied. The control circuit executing the instructions can output one or more command instructions to the voice assistant, wherein the one or more command instructions cause the voice assistant to provide, using one or more human-machine interfaces, a response to the user prompt.

Additional Disclosure

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A vehicle computing system of a vehicle comprising: a control circuit configured to:

receive, by one or more interior vehicle sensors, a user prompt from a user, wherein the user prompt is input into a voice assistant on-board the vehicle;

process, using one or more processors, the user prompt with a master language model agent, wherein the master language model agent is configured to:

determine, based on environmental data, one or more intermediate actions responsive to the user prompt, wherein the environmental data is received from at least one of (i) the one or more interior vehicle sensors, (ii) one or more exterior vehicle sensors, (iii) user input, or (iv) one or more remote computing systems;

implement, via an orchestrator, the one or more intermediate actions via one or more intermediate action tools comprising a vehicle application programming interface (API), each intermediate action causing an action result within the vehicle;

iteratively evaluate, based on the environmental data, whether each action result of the one or more intermediate actions satisfies the user prompt, wherein iteratively evaluating each intermediate action comprises implementing each intermediate action and reasoning over the action result of each intermediate action to determine whether the user prompt is satisfied; and output one or more command instructions to the voice assistant, wherein the one or more command instructions cause the voice assistant to provide, using one or more human-machine interfaces, a response to the user prompt.

2. The vehicle computing system of claim 1, wherein the master language model agent is further configured to:

determine, based on the one or more intermediate actions, one or more vehicle actions responsive to the user prompt; and output the one or more command instructions to activate a vehicle function corresponding to the one or more vehicle actions.

3. The vehicle computing system of claim 2, wherein the vehicle function comprises at least one of:

(i) emitting an audio response;

(ii) updating a user interface within the vehicle;

(iii) adjusting a temperature setting within the vehicle;

(iv) providing an entertainment suggestion;

(v) providing a destination suggestion; or (vi) adjusting a comfort setting with the vehicle.

4. The vehicle computing system of claim 1, wherein the environmental data comprises data captured by one or more interior vehicle sensors or exterior vehicle sensors.

5. The vehicle computing system of claim 1, wherein the master language model agent is further configured to:

generate, based on the environmental data, context data associated with a user profile of the user, wherein the context data comprises additional information associated with the user prompt.

6. The vehicle computing system of claim 5, wherein the one or more intermediate actions are determined based on the context data and wherein the one or more intermediate actions satisfies the user prompt based on the context data.

7. The vehicle computing system of claim 1, wherein the one or intermediate actions comprises communicating with another language model agent, the other language model agent associated with at least one of: (i) a specialized machine-learned model or (ii) a dataset remote from the master language model agent.

8. The vehicle computing system of claim 1, wherein the master language model agent is configured further to:

determine, based on the environmental data, an intent of the user, the intent associated with the one or more intermediate actions; and determine the one or more intermediate actions based on the intent of the user.

9. The vehicle computing system of claim 1, wherein the master language model agent is further configured to:

orchestrate communications and actions across a plurality of language model agents to implement the one or more intermediate actions.

10. The vehicle computing system of claim 1, wherein the one or more intermediate actions that satisfies the user prompt is indicative of an implicit action associated with the user prompt.

11. A computer-implemented method for controlling functionality of a vehicle comprising:

receiving, by one or more interior vehicle sensors, a user prompt from a user, wherein the user prompt is input into a voice assistant on-board the vehicle;

processing, using one or more processors, the user prompt with a master language model agent, wherein the master language model agent is configured to:

determine, based on environmental data, one or more intermediate actions responsive to the user prompt, wherein the environmental data is received from at least one of (i) the one or more interior vehicle sensors, (ii) one or more exterior vehicle sensors, (iii) user input, or (iv) one or more remote computing systems;

implement, via an orchestrator, the one or more intermediate actions via one or more intermediate action tools comprising a vehicle application programming interface (API), each intermediate action causing an action result within the vehicle;

iteratively evaluate, based on the environmental data, whether each action result of the one or more intermediate actions satisfies the user prompt, wherein iteratively evaluating each intermediate action comprises implementing each intermediate action and reasoning over the action result of each intermediate action to determine whether the user prompt is satisfied; and outputting one or more command instructions to the voice assistant, wherein the one or more command instructions cause the voice assistant to provide, using one or more human-machine interfaces, a response to the user prompt.

12. The computer-implemented method of claim 11, wherein the master language model agent is further configured to:

determine, based on the one or more intermediate actions, one or more vehicle actions responsive to the user prompt; and output the one or more command instructions to activate a vehicle function corresponding to the one or more vehicle actions.

13. The computer-implemented method of claim 12, wherein the vehicle function comprises at least one of:

(i) emitting an audio response;

(ii) updating a user interface within the vehicle;

(iii) adjusting a temperature setting within the vehicle;

(iv) providing an entertainment suggestion;

(v) providing a destination suggestion; or (vi) adjusting a comfort setting with the vehicle.

14. The computer-implemented method of claim 11, wherein the environmental data comprises data captured by one or more interior vehicle sensors or exterior vehicle sensors.

15. The computer-implemented method of claim 11, wherein the master language model agent is further configured to:

generate, based on the environmental data, context data associated with a user profile of the user, wherein the context data comprises additional information associated with the user prompt.

16. The computer-implemented method of claim 15, wherein the one or more intermediate actions are determined based on the context data and wherein the one or more intermediate actions satisfies the user prompt based on the context data.

17. The computer-implemented method of claim 11, wherein the one or intermediate actions comprises communicating with another language model agent, the other language model agent associated with at least one of: (i) a specialized machine-learned model or (ii) a dataset remote from the master language model agent.

18. The computer-implemented method of claim 11, wherein the master language model agent is configured further to:

determine, based on the environmental data, an intent of the user, the intent associated with the one or more intermediate actions; and determine the one or more intermediate actions based on the intent of the user.

19. The computer-implemented method of claim 11, wherein the master language model agent is further configured to:

orchestrate communications and actions across a plurality of language model agents to implement the one or more intermediate actions.

20. One or more non-transitory computer-readable media storing instructions executable by a control circuit to:

receive, by one or more interior vehicle sensors, a user prompt from a user, wherein the user prompt is input into a voice assistant on-board the vehicle;

process, using one or more processors, the user prompt with a master language model agent, wherein the master language model agent is configured to:

determine, based on environmental data, one or more intermediate actions responsive to the user prompt, wherein the environmental data is received from at least one of (i) the one or more interior vehicle sensors, (ii) one or more exterior vehicle sensors, (iii) user input, or (iv) one or more remote computing systems;

implement, via an orchestrator, the one or more intermediate actions via one or more intermediate action tools comprising a vehicle application programming interface (API), each intermediate action causing an action result within the vehicle;

iteratively evaluate, based on the environmental data, whether each action result of the one or more intermediate actions satisfies the user prompt, wherein iteratively evaluating each intermediate action comprises implementing each intermediate action and reasoning over the action result of each intermediate action to determine whether the user prompt is satisfied; and output one or more command instructions to the voice assistant, wherein the one or more command instructions cause the voice assistant to provide, using one or more human-machine interfaces, a response to the user prompt.

* * * * *